US012701012B2

(12) United States Patent
Yeo et al.

(10) Patent No.: US 12,701,012 B2
(45) Date of Patent: Aug. 4, 2026

(54) METHOD AND APPARATUS FOR PROVING ORIGINALITY OF CREATIVE DESIGN ON BASIS OF WEARABLE DEVICE

(71) Applicant: AINTOPSYSTEM CO., LTD., Seoul (KR)

(72) Inventors: Tae Hwan Yeo, Seoul (KR); Bong Sup Lee, Seoul (KR)

(73) Assignee: AINTOPSYSTEM CO., LTD., Seoul (KR)

( * ) Notice: Subject to any disclaimer, the term of this patent is extended or adjusted under 35 U.S.C. 154(b) by 0 days.

(21) Appl. No.: 19/291,769

(22) Filed: Aug. 6, 2025

(65) Prior Publication Data

US 2025/0358129 A1 Nov. 20, 2025

Related U.S. Application Data

(63) Continuation of application No. PCT/IB2024/061539, filed on Nov. 19, 2024.

(30) Foreign Application Priority Data

Sep. 22, 2023 (KR) ........................ 10-2023-0126817

(51) Int. Cl.
| | |
|---|---|
| *H04L 9/32* | (2006.01) |
| *G06T 5/20* | (2006.01) |
| *H04L 9/00* | (2022.01) |

(52) U.S. Cl.
CPC .............. *H04L 9/3236* (2013.01); *G06T 5/20* (2013.01); *H04L 9/50* (2022.05)

(58) Field of Classification Search
CPC ....... H04L 9/3236; H04L 9/50; H04L 9/3239; H04L 9/00; H04L 9/32; G06T 5/20; G06Q 50/10
See application file for complete search history.

(56) References Cited

U.S. PATENT DOCUMENTS

| | | |
|---|---|---|
| 12,111,960 B2 | 10/2024 | Yeo et al. |
| 2007/0172055 A1 | 7/2007 | Jo |

FOREIGN PATENT DOCUMENTS

| | | | | |
|---|---|---|---|---|
| CN | 108364242 A | * | 8/2018 | ........... G06Q 50/184 |
| JP | 2005-346041 A | | 12/2005 | |

(Continued)

OTHER PUBLICATIONS

International Search Report of PCT/IB2024/061539 dated Feb. 21, 2025 [PCT/ISA/210].

(Continued)

*Primary Examiner* — Linglan Edwards
*Assistant Examiner* — Saron Matthewos Worku
(74) *Attorney, Agent, or Firm* — Sughrue Mion, PLLC

(57) ABSTRACT

A method and apparatus for proving the originality of a creative design in a communication system, on the basis of a wearable device, by proving a causal relationship between a creative process of the creative design and a creative output by using a hash code associated with an image for each creative process of the creative design, and generating a piece of final hash information by combining a hash code for an intermediate image and a hash code for a final image during a creative process of a creative design through an arithmetic function, and transmitting an NFT including the final hash information and information about the final image to a blockchain, such that a design creator can claim an association between the intermediate image and the final image during the creative process of the creative design together at the time of disclosure of the design on a blockchain network.

7 Claims, 16 Drawing Sheets

(56)                   References Cited

FOREIGN PATENT DOCUMENTS

| | | | | | |
|---|---|---|---|---|---|
| JP | 2007-520098 | A | | 7/2007 | |
| KR | 10-2071064 | B1 | | 1/2020 | |
| KR | 20200021853 | A | * | 3/2020 | ........... G06Q 30/018 |
| KR | 10-2021-0140801 | A | | 11/2021 | |
| KR | 20210140801 | A | * | 11/2021 | .............. H04L 9/50 |
| KR | 10-2513588 | B1 | | 3/2023 | |

OTHER PUBLICATIONS

Korean Office Action of No. 10-2023-0126817 dated Jun. 19, 2024.
Korean Decision to Grant a Patent of No. 10-2023-0126817 dated
Nov. 5, 2024.

* cited by examiner

FIG. 6
AVERAGE HASH
Source image(colored)    Grayscale image    Gray value image, size 8×8    Comparison to average
Hash: 000000000000010000000000000000100000010101111111111111110
BLOCK HASH
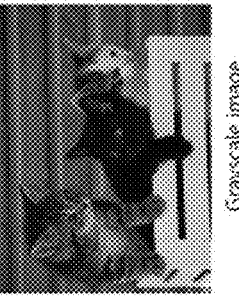
Source image(colored)    Grayscale image    Gray value image, size 256×256    Partitioning of the 64 blocks    Block results
Hash: 001110001001110000001110011001101010001101000010111001110

FIG. 7
DIFFERENCE HASH
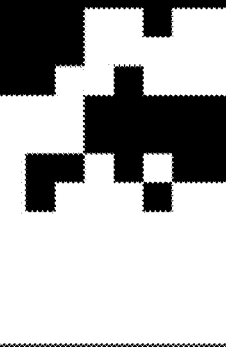
Source image(colored)     Grayscale image     Gray value image, size 9×8     Comparison to the neighbor to the right
Hash: 1111000000110000101110001100110011010000110100011101000111110
MEDIAN HASH
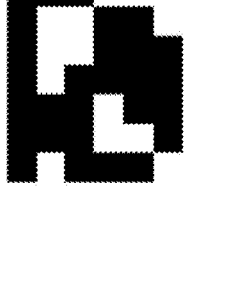
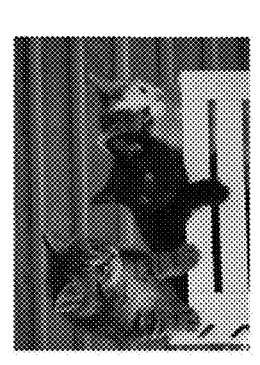
Source image(colored)     Grayscale image     Gray value image, size 8×8     Comparison to median
Hash: 0000000001001110000001100110001010100101000010100011111111111111

FIG. 8
PERCEPTUAL HASH
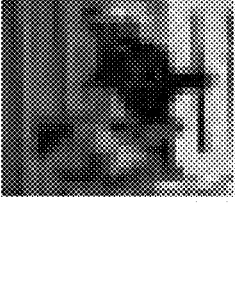
Gray value image, size 32×32
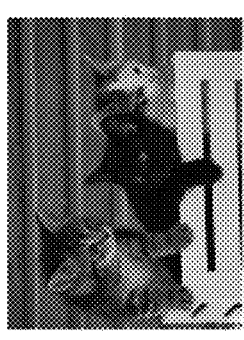
Grayscale image
Upper left corner (highest frequency)
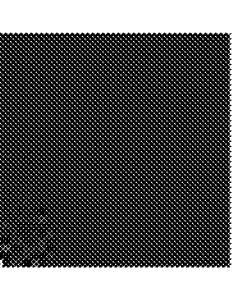
After DCT by column (normalized)
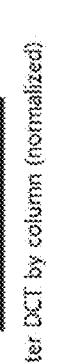
Comparison to median
Source image(colored)
After DCT by row (normalized)
Hash: 1010010010101011011011001100110011011011001011101101101010101110

FIG. 9
WAVELET HASH
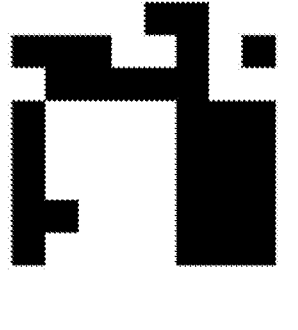
First wavelet transform
Comparison to median
Gray value image, size 8×8
Fourth wavelet transform
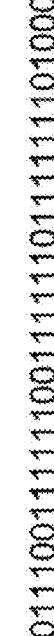
Grayscale image
Third wavelet transform
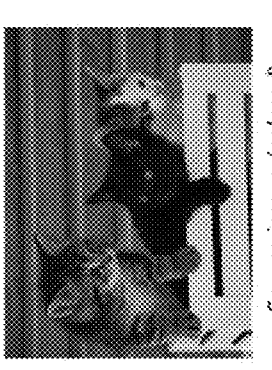
Source image (colored)
Second wavelet transform
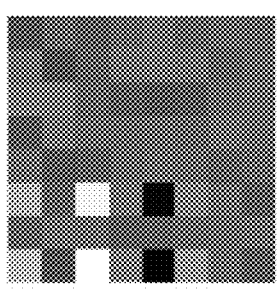
Hash: 0000010101110011110011111011111110101000000000000011100000101

Figure 14:
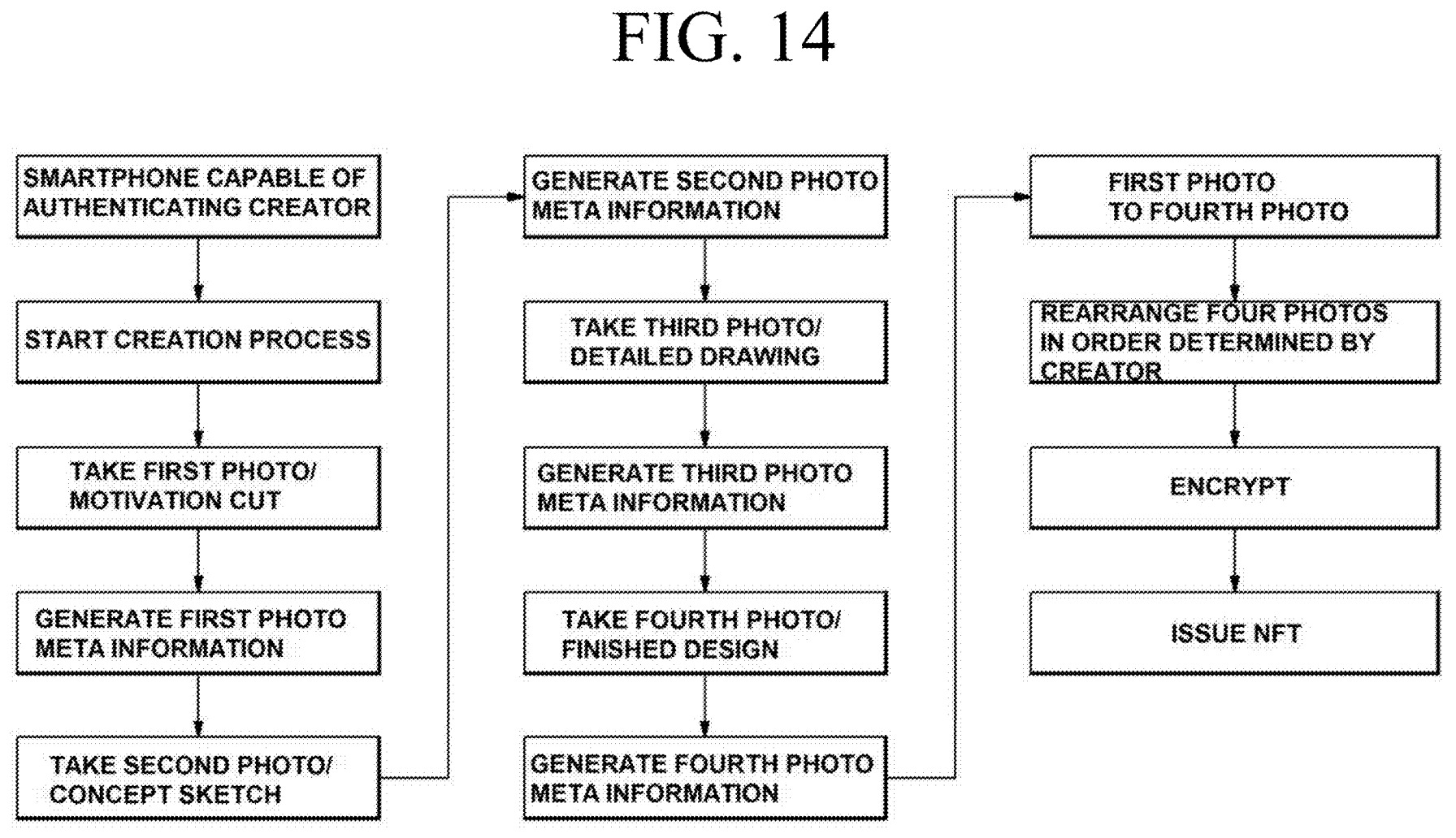

FIRST PHOTO TO FOURTH PHOTO → REARRANGE FOUR PHOTOS IN ORDER DETERMINED BY CREATOR → ENCRYPT → ISSUE NFT

GENERATE SECOND PHOTO META INFORMATION → TAKE THIRD PHOTO/ DETAILED DRAWING → GENERATE THIRD PHOTO META INFORMATION → TAKE FOURTH PHOTO/ FINISHED DESIGN → GENERATE FOURTH PHOTO META INFORMATION

SMARTPHONE CAPABLE OF AUTHENTICATING CREATOR → START CREATION PROCESS → TAKE FIRST PHOTO/ MOTIVATION CUT → GENERATE FIRST PHOTO META INFORMATION → TAKE SECOND PHOTO/ CONCEPT SKETCH

METHOD AND APPARATUS FOR PROVING ORIGINALITY OF CREATIVE DESIGN ON BASIS OF WEARABLE DEVICE

CROSS REFERENCE TO RELATED APPLICATIONS

This application is a Rule 53(b) Continuation of International Application No. PCT/IB2024/061539 filed on Nov. 19, 2024, claiming priority based on Korean Patent Application No. 10-2023-0126817 filed on Sep. 22, 2023, the respective disclosures of which are incorporated herein by reference in their entirety.

TECHNICAL FIELD

The present invention relates to a method and device for proving the originality of a creative design work and who is the original creator in a communication system based on a user terminal including a wearable device by proving the causal relationship between the creation process of the creative design work and the creation result using the hash codes of images in creation stages of the creative design work. Specifically, the present invention relates to a method and device for proving the originality of a creative design work that involve combining hash codes for intermediate images in the creation process of a creative design, such as a painting, an art work, a commercial or non-commercial design, a clothing design, or the like, and a hash code for a final image using a function to generate one piece of final hash information, transmitting a non-fungible token (NFT) including the final hash information and final image information to a blockchain, and thus allowing the design creator to claim the connection between the intermediate images in the creation process of the creative design and the final image at the time of disclosure on the blockchain network and to prove the narrative that the final image was obtained through the creation of the intermediate images in the creation process of the final image in the event of a problem with the creation process of the final image.

BACKGROUND ART

The design industry is characterized by the importance of creativity represented by the uniqueness of designs, fast market flow, and easy replication.

Although there are procedures for registering and protecting designs on the basis of the law, it takes a certain amount of time to register. Also, it is not easy to prove whether a design is copied from a creative design registered using a registered design right using tangible evidence with temporal precedence.

In general, clothing, shoes, hats, accessories such as jewelry and the like, furniture, various belongings, art works, commercial and non-commercial designs, and the like that are created by humans and have visual elements having an overwhelming influence on the determination of value are subject to rights on the basis of the finished final creative works, final creations, or final creative work images. However, determining rights solely on the basis of "the final creative work and the final creative work image" cannot prove the artistic value of the narrative inherent in the work and the intermediate results obtained in the creation process, and cannot protect the rights of the creator to the intermediate results that are obtained during a process from conception to completion of the creative work. In other words, the value of a creative work is not limited to the "final work and final creative work image," and the artistic and economic value of the intermediate outcomes of the creation process should also be protected by the rights of the original creator and copyright holder. Lately, there have been a number of cases where third parties have tried to pursue economic benefits by issuing non-fungible tokens (NFTs) without the content of the original creators or copyright holders. However, there is no appropriate method of punishment, and many similar lawsuits have been filed repeatedly.

When it is clear to each member of the market that a design has been stolen, it may be possible for the market to protect the creative design from copycat designs by its own judgment. The market wants to safely invest in genuinely creative designs that have legitimate rights. In other words, the current unfair advantage of copycat designs in the market is due in large part to the market's inability to determine which designs are truly original.

When each member of the relevant market can quickly and clearly determine and recognize that a design is a stolen or plagiarized design of an original creative design work, it is possible to effectively respond to theft and plagiarism of creative design works (fashion apparel, commercial and non-commercial art, and the like) of which visual elements have an overwhelming influence on value determination, creators' rights to creative design works can be legitimately protected, and investors who expect economic benefits from various ancillary businesses utilizing creative design works are able to make relatively safe investments. Therefore, this is a reasonable basis for original creators to expect economic benefits from the rental or transfer of the images of their creative works and the licenses to use the works. Currently, there are many cases of illegal behavior being used for gaining unfair economic benefits by illegally plagiarizing and stealing images of other people's creative designs. These cases may not only cause economic and mental damage to innocent creators but may also increase the social cost of such illegal behavior, which will have a negative impact on the overall society.

Therefore, various embodiments of the present invention provide a method and device for "specifying and authenticating a creator" using a mobile communication device equipped with a digital camera and a dedicated application installed on the mobile communication device as a method of proving the "uniqueness of a creative design work," sequentially taking and recording many digital photographs of "intermediate creative results and a final creative result" generated in the creator's creation process, generating and encrypting unique functions for the "intermediate creative works or intermediate creative work images" acquired through the process and "the final creative work and the final creative work image" finished through the process on the basis of metadata of each image according to a determined procedure and method, transmitting and registering the encrypted unique functions in a blockchain, and proving the originality together with the narrative of the creator's entire creation process while proving the artistic and economic value of the intermediate stage of the creation process.

Copyright is obtained at the time of creation and does not require any procedure or formality. This is called the "non-formality principle." This is different from industrial property rights, such as patents, designs, trademarks, and the like, which require a registered application to create rights. A creator is not obligated to disclose the original design, only to prove that he or she created the design at a specific point in time in the event of a question of causation.

Therefore, when a creator conflicts with a certain third party about the creation process of a final image after disclosing only the final image to a number of unspecified people with no intermediate images in order to avoid disclosing the intermediate images to a number of unspecified people, there is a necessity for a method and device to prove the narrative that the creator created the intermediate images in the creation process of the final image and finished the final image.

Creators are not obligated to disclose images of their creation processes, and instead disclose only their works as final creative images and final resultant images. However, there is no technically flawless method of proving to a third party that a work is created by a creator himself or herself, and a method and device are necessary to verify the narrative and originality based on causal proof that a work was obtained as a final image through intermediate stages in a creation process.

DISCLOSURE

Technical Problem

To solve the foregoing problem, the present invention has the following objects. The present invention is directed to providing a method and device for proving the originality of a creative design in a communication system based on a user terminal including a wearable device by proving the causal relationship between the creation process of the creative design and a work as a creation result using hash codes related to digital images of images in creation stages of the creative design.

The present invention is also directed to providing a method and device for proving the time of creation of a creative design in a communication system by disclosing a final image of the creative design on a blockchain network using a non-fungible token (NFT) and then proving the originality of the creative design by proving the narrative that the final image was created through the creation of intermediate images in the creation process of the final image in the event of a problem with the creation process of the final image, for example, a problem of checking whether a third party was involved in the work by verifying who actually performed the creative work in terms of plagiarism, theft, or the like.

The present invention is also directed to providing a method and device for generating one piece of final hash information by combining hash codes for intermediate images in the creation process of a creative design, such as a painting, an art work, an apparel design, a commercial or non-commercial design, or the like, and a hash code for a final image using an operation function and then transmitting an NFT including the final hash information and information on the final image to a blockchain so that a design creator can claim the association between the intermediate images in the creation process and the final image at the time of disclosing the design on the blockchain network.

The present invention is also directed to providing a method and device for supporting proof of the creation of intermediate images in the creation process of a final image by transmitting information on the intermediate images, hash functions, and operation functions to a specific third party as elements for generating final hash information included in an NFT of the final image when a creator who does not want to disclose the intermediate images in the creation process of the creative design to a number of unspecified people is requested by the third party to prove the creation process of the final image of the creative design.

Objects of the present invention are not limited to those described above, and other objects which have not been described will be clearly understood by those of ordinary skill in the art from the following description.

Technical Solution

One aspect of the present invention provides an operating method of a first terminal including a transceiver, a memory, a processor, an input device, an output device, and a camera in a communication system, the operating method including capturing, by the camera, a plurality of intermediate images in creation stages of a design and one final image, wherein the plurality of intermediate images are captured during creation times of the creation stages of the design and the final image is captured during a final creation time of the design; generating, by the processor, within a set time from the time of capturing each of the plurality of intermediate images and the final image: a plurality of pieces of intermediate image hash information corresponding to each of the plurality of intermediate images and final image hash information corresponding to the final image using a first function, which is an image hash function, stored in the memory, wherein the first function is configured as an image hash function configured to convert image data into hash information, and the plurality of pieces of intermediate image hash information and the final image hash information are generated by converting images obtained by passing the plurality of intermediate images and the final image through a specific image filter into specific images of a specific fixed size, and then applying the first function to a specific region of the specific images of the specific fixed size, and the specific image filter is at least one image filter randomly selected by the processor from a plurality of image filters stored in the memory, wherein the specific image filter includes a sequential application combination of a plurality of image filters, and the plurality of image filters are configured such that image transformation is performed differently when an application order for an image is different; generating, by the processor, within the set time from the time of capturing each of the plurality of intermediate images and the final image: each of a plurality of pieces of first block information for each of a plurality of first non-fungible tokens (NFTs) based on an image in a form in which each of the plurality of pieces of intermediate image hash information and the final image hash information is described as text, and information related to the first terminal; transmitting, by the transceiver, within the set time from the time of capturing each of the plurality of intermediate images and the final image: each of the plurality of pieces of first block information corresponding to each of the plurality of pieces of intermediate image hash information and the final image hash information to a blockchain network; inputting the plurality of pieces of intermediate image hash information and the final image hash information to a second function stored in the memory to generate final hash information by the processor, wherein the second function is composed of a combination of logical operations; generating, by the processor, second block information for a second NFT based on the information related to the first terminal, information on the final image, information related to the plurality of first NFTs, and the final hash information; transmitting, by the transceiver, the second block information to the blockchain network; receiving, by the transceiver, a proof request message for the plurality of intermediate images generated in a creation process of the final image corresponding to the second NFT from a second terminal which is one of a plurality of nodes constituting the blockchain network; and transmitting, by the transceiver, a proof response message including information on the plurality of intermediate images, information on the first function, information on the second function, information on the specific image filter, information on each of the plurality of image filters, information on the application order of the plurality of image filters, and information on the specific fixed size and the specific region to the second terminal.

Another aspect of the present invention provides a first terminal in a communication system, the first terminal including a transceiver, a memory, a processor, an input device, an output device, and a camera. The processor is configured to perform an operating method of the first terminal according to various embodiments of the present invention.

Still another aspect of the present invention provides a computer-readable storage medium having recorded thereon a computer program that, when executed by a computer, causes the computer to perform the method according to various embodiments of the present invention.

Advantageous Effects

According to the present invention, it is possible to provide a method and device for proving the narrative and originality of a creative design in a communication system based on a user terminal including a wearable device by proving the causal relationship between the creation process of the creative design and a creation result using hash codes related to images in creation stages of the creative design.

According to the present invention, it is also possible to provide a method and device for proving the time of creation of a creative design in a communication system by disclosing a final image of the creative design on a blockchain network using a non-fungible token (NFT) and then proving the originality of the creative design by proving the narrative that the final image was created through the creation of intermediate images in the creation process of the final image in the event of a problem with the creation process of the final image.

According to the present invention, it is also possible to provide a method and device for generating one piece of final hash information by combining hash codes for intermediate images in the creation process of a creative design, such as a painting, an art work, an apparel design, a commercial or non-commercial design, or the like, and a hash code for a final image using an operation function and then transmitting an NFT including the final hash information and information on the final image to a blockchain so that a design creator can claim the association between the intermediate images in the creation process and the final image at the time of disclosing the design on the blockchain network.

According to the present invention, it is also possible to provide a method and device for supporting proof of the creation of intermediate images in the creation process of a final image by transmitting information on the intermediate images, hash functions, and operation functions to a specific third party as elements for generating final hash information included in an NFT of the final image when a creator who does not want to disclose the intermediate images in the creation process of the creative design to a number of unspecified people is requested by the third party to prove the creation process of the final image of the creative design.

Effects of the present invention are not limited to those described above, and other effects which have not been described will be clearly understood by those of ordinary skill in the art from the following description.

DESCRIPTION OF DRAWINGS

FIG. 6 shows examples of image hash functions that are applicable to an image according to various embodiments of the present invention.

FIG. 7 shows examples of image hash functions that are applicable to an image according to various embodiments of the present invention.

FIG. 8 shows an example of an image hash function that is applicable to an image according to various embodiments of the present invention.

FIG. 9 shows an example of an image hash function that is applicable to an image according to various embodiments of the present invention.

FIG. 11 is a diagram illustrating a non-fungible token (NFT) generation process based on creation stage-specific creative designs according to various embodiments of the present invention.

FIG. 14 is a diagram illustrating a process of generating and uploading an encrypted NFT based on creation stage-specific creative designs to a blockchain according to various embodiments of the present invention.

MODES OF THE INVENTION

Hereinafter, embodiments of the present invention will be described in detail with reference to the accompanying drawings so that those skilled in the technical field to which the present invention pertains can easily implement the present invention. The present invention can be implemented in various different forms and is not limited to the embodiments described below.

Figure 1:
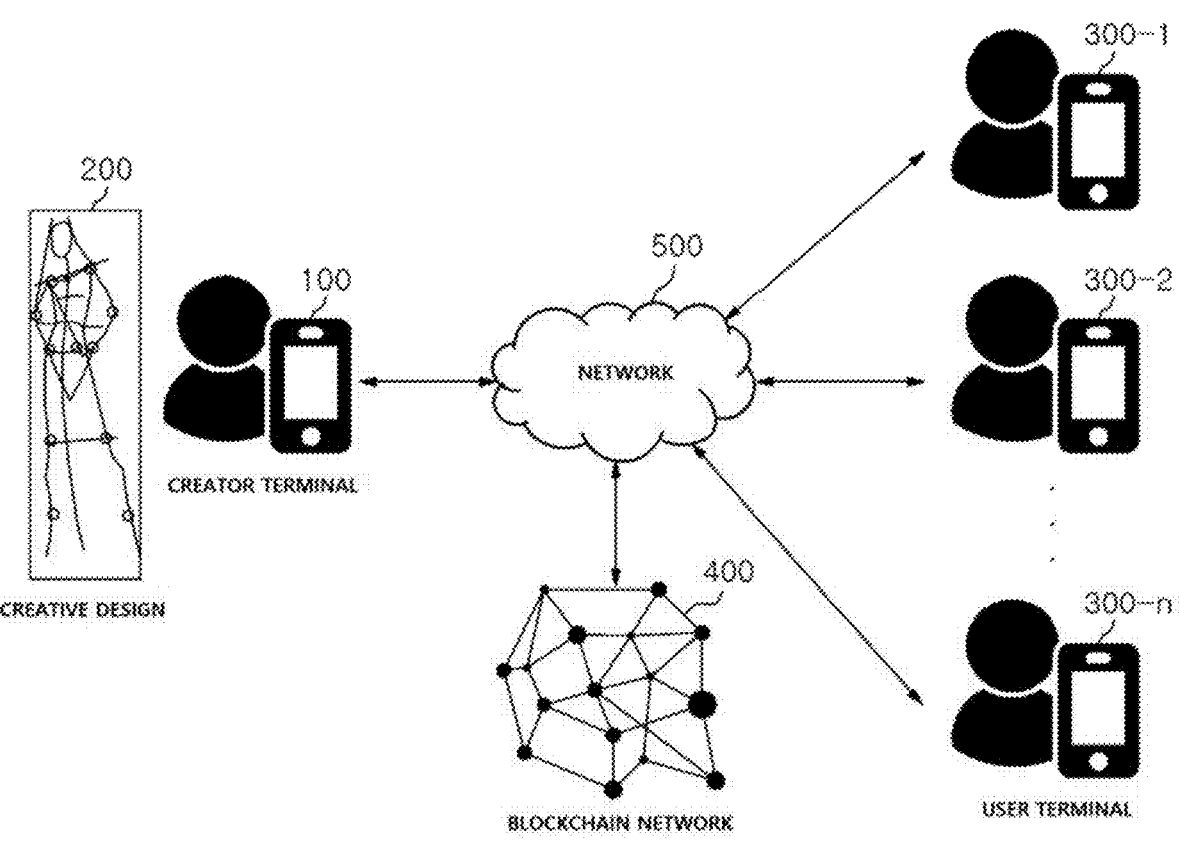
FIG. 1 is a diagram of a communication system according to various embodiments of the present invention.

FIG. 1 is a diagram of a communication system according to various embodiments of the present invention.

Referring to FIG. 1, a communication system according to an embodiment of the present invention includes a creator terminal 100, user terminals 300 (300-1, 300-2, . . . , and 300-n), a blockchain network 400, and a wired/wireless communication network 500.

The creator terminal 100 is a terminal run by a creator of a creative design 200. The creator terminal 100 may capture an image of the creative design 200, generate encryption information on the basis of the captured image, and transmit the generated encryption information to the blockchain network 400 through the wired/wireless communication network 500. The creator terminal 100 may be an electronic device, such as a computer, a cellular phone, a smartphone, a tablet computer, a wearable device, a smart glasses, an augmented reality glasses (AR glasses), a smart watch, a wearable smart device, or the like, that includes a transceiver for transmitting and receiving information, a memory for storing information, at least one processor for computing information, an input device for inputting information, an output device for outputting information, a camera, and the like. If an emphasis is placed on conveniently capturing and instantly transmitting images in daily life using a wearable smart device, smart glasses with enhanced camera and instant sharing functions or a small wearable camera are suitable. These devices allow a user to capture moments hands-free and transmit images or videos in real time through a cellular network or a network such as Wi-Fi or Bluetooth. In particular, AR smart glasses combine visual information with a camera function and can greatly simplify daily tasks that require capturing and transmission, such as by automatically saving and transmitting an image with necessary information to another device or the cloud after the image is captured. Examples of wearable smart devices include watch-type smartwatches, glasses-type smart glasses, wearable cameras that can be attached to clothes or a hat, and VR (virtual reality)/AR (augmented reality) headsets.

The user terminals 300 (300-1, 300-2, . . . , and 300-n) correspond to nodes constituting the blockchain network 400 and are terminals for accessing the blockchain network 400 through the wired/wireless communication network 500 and transmitting and receiving information. Users of the user terminals 300 (300-1, 300-2, . . . , and 300-n) may receive information on the creative design 200 from the blockchain network 400 and recognize the information on the creative design 200. The user terminals 300 (300-1, 300-2, . . . , and 300-n) may be electronic devices, such as a computer, a cellular phone, a smartphone, a tablet computer, and the like, that include a transceiver for transmitting and receiving information, a memory for storing information, at least one processor for computing information, an input device for inputting information, an output device for outputting information, a camera, and the like.

The blockchain network 400 is a plurality of nodes that operate on the basis of blockchain technology. The blockchain technology is a distributed storage technology for storing data to be managed in a plurality of nodes constituting a blockchain network using a storage structure in which blocks are connected in a chain form. The blockchain network 400 may store a transaction received from at least one of nodes, such as the creator terminal 100, the user terminals 300 (300-1, 300-2, . . . , and 300-n), and the like, constituting the blockchain network in the form of a block on the basis of a predetermined consensus algorithm. The data stored in the form of a block may be shared among the plurality of nodes constituting the blockchain network 400.

Depending on the implementation form, the blockchain network 400 may be a public blockchain network in which arbitrary nodes may perform a consensus operation or a private blockchain network in which only predetermined nodes may perform a consensus operation.

The consensus algorithm used in the blockchain network 400 according to various embodiments of the present invention may be a proof of work (PoW) algorithm, a proof of stake (PoS) algorithm, a delegated proof of stake (DPoS) algorithm, a practical byzantine fault tolerance (PBFT) algorithm, a delegated byzantine fault tolerance (DBFT) algorithm, a redundant byzantine fault tolerance (RBFT) algorithm, a sieve algorithm, a Tendermint algorithm, a Paxos algorithm, a Raft algorithm, a proof of authority (PoA) algorithm, and/or a proof of elapsed time (PoET) algorithm.

According to various embodiments of the present invention, the nodes in the blockchain network 400 may operate due to a blockchain core package based on a hierarchical structure. The hierarchical structure may include a data layer for defining the structure of data handled in the blockchain network 400 and managing the data, a consensus layer for verifying the validity of a block, mining to generate a block, and processing fees paid to miners for the mining process, an execution layer for processing and executing a smart contract, a common layer for implementing and managing a peer-to-peer (P2P) network protocol, hash functions, electronic signatures, encoding, and a common storage, and an application layer for generating, processing, and managing various applications.

The wired/wireless communication network 500 provides a communication path in which the creator terminal 100, the user terminals 300 (300-1, 300-2, . . . , and 300-n), and the blockchain network 400 may transmit and receive signals and data to and from each other. The wired/wireless communication network 500 is not limited to a communication method based on a specific communication protocol, and an appropriate communication method may be used for an implementation example. For example, when the system is based on the Internet protocol (IP), the wired/wireless communication network 500 may be implemented as a wired/wireless Internet network, and the creator terminal 100, the user terminals 300 (300-1, 300-2, . . . , and 300-n), and the blockchain network 400 may be implemented as a wireless network such as a cellular network or wireless local area network (WLAN).

Figure 2:
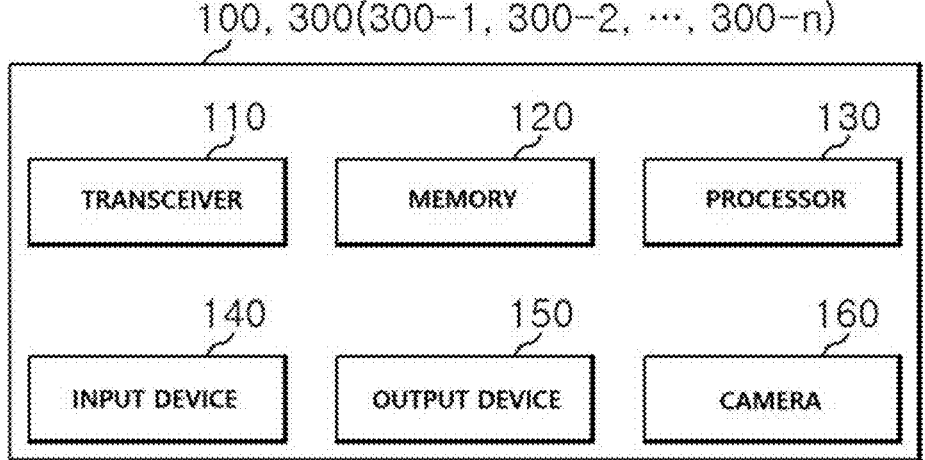
FIG. 2 is a block diagram of a creator terminal and a user terminal according to various embodiments of the present invention.

FIG. 2 is a block diagram of a creator terminal and a user terminal according to various embodiments of the present invention.

Referring to FIG. 2, each of the creator terminal 100 and the user terminals 300 (300-1, 300-2, . . . , and 300-n) according to various embodiments of the present invention includes a transceiver 110, a memory 120, a processor 130, an input device 140, an output device 150, and a camera 160.

The transceiver 110 is connected to the processor 130 and transmits and/or receives a signal. All or a part of the transceiver 110 may be referred to as "transmitter," "receiver," or "transceiver." The transceiver 110 may support at least one of various wireless communication standards such as an Institute of Electrical and Electronics Engineers (IEEE) 802.xx system, an IEEE Wi-Fi system, a Third Generation Partnership Project (3GPP) system, a 3GPP Long Term Evolution (LTE) system, a 3GPP fifth generation (5G) New Radio (NR) system, a Third Generation Partnership Project 2 (3GPP2) system, Bluetooth, and the like which are wired access systems and wireless access systems.

The memory 120 may be connected to the transceiver 110, the processor 130, the input device 140, and the output device 150 and may store information input through the input device 140, information received through communication of the transceiver 110, and the like. Also, the memory 120 may store information on images captured by the camera 160 and the like. Further, the memory 120 may be connected to the processor 130 and store data such as a basic program, an application program, and setting information for operation of the processor 130, information generated through computation of the processor 130, and the like. The memory 120 may be configured as a volatile memory, a non-volatile memory, or a combination thereof. The memory 120 may provide stored data according to a request of the processor 130.

The processor 130 may be configured to implement procedures and/or methods proposed in the present invention. The processor 130 controls overall operations of the creator terminal 100 or the user terminals 300 (300-1, 300-2, . . . , and 300-*n*). For example, the processor 130 transmits or receives information and the like through the transceiver 110. The processor 130 writes and reads data to and from the memory 120. The processor 130 receives information through the input device 140. The processor 130 outputs information through the output device 150. The processor 130 captures images through the camera 160. The processor 130 may include at least one processor.

The input device 140 may be connected to the processor 130 and may input information and the like. According to an embodiment, the input device 140 may input information and the like received through the transceiver 110 from another device connected to the wired/wireless communication network 500. The input device 140 may include a touch display, a keypad, a keyboard, or the like.

The output device 150 may be connected to the processor 130 and may output information and the like in the form of an image, voice, and the like. According to an embodiment, the output device 150 may output information and the like received through the transceiver 110 from another device connected to the wired/wireless communication network 500. The output device 150 may include a display, a speaker, and the like.

The camera 160 may be connected to the processor 130 and may capture an image of an object in front of the camera 160.

Figure 3:
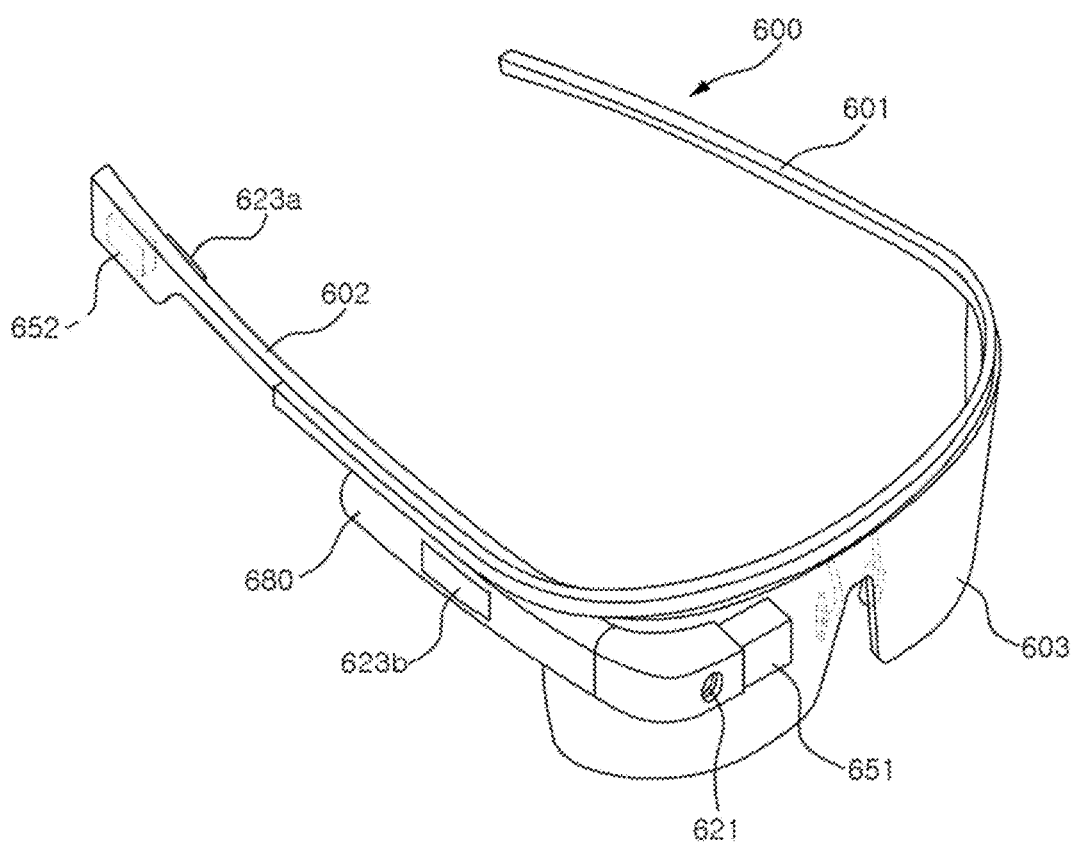
FIG. 3 illustrates an exemplary structure of a creator terminal according to various embodiments of the present invention.

FIG. 3 illustrates an exemplary structure of a creator terminal according to various embodiments of the present invention. According to various embodiments of the present invention, the creator terminal 100 may be implemented as AR glasses 600. In various embodiments of the present invention, terms such as smart glasses and AR glasses (augmented reality glasses) can be used interchangeably to refer to the same configuration.

FIG. 3 shows an example configuration of AR glasses, and it is apparent that the AR glasses according to various embodiments of the present invention are not limited to the example in FIG. 3.

Referring to FIG. 3, the AR glasses 600 are designed to be worn on the head and may include a frame section, for example, a case, housing, or other components. The frame section may be made of flexible material for ease of wear. FIG. 3 illustrates the frame section as including a first frame 601 and a second frame 602 made of different materials.

Here, the AR glasses 600 are assumed to include the functions of a mobile terminal.

The frame section supports the head and provides space for mounting various components. As shown, the frame section may be equipped with electronic components such as a control module 680 and an audio output module 652. Additionally, the frame section may have a removable lens 603 that covers at least one of the left or right eyes.

The control module 680 is designed to control various electronic components provided in the AR glasses 600, store information, and perform transmission and reception of information with other devices. The control module 680 can be understood as a configuration that combines the transceiver 110, memory 120, and processor 130 described in FIG. 2. In FIG. 3, the control module 680 is illustrated as being installed on the frame section on one side of the head. However, the position of the control module 680 is not limited to this.

The display unit 651 may be implemented in the form of a head-mounted display (HMD). The HMD form refers to a display method that is mounted on the head and directly shows images in front of the user's eyes. When the user wears the AR glasses 600, the display unit 651 can be arranged to correspond to at least one or both of the left and right eyes, providing images directly in front of the user's eyes. FIG. 3 illustrates the display unit 651 as positioned in correspondence to the right eye to output images toward it. The display unit 651 can be understood as corresponding to the output device 150 described in FIG. 2.

The display unit 651 can project images to the user's eyes using a prism. Furthermore, the prism may be made transparent so that the user can see both the projected image and the normal forward field of view, i.e., the range visible through the eyes. The images output through the display unit 651 may overlap with the normal field of view. Utilizing these characteristics, the AR glasses 600 can provide augmented reality (AR), which superimposes virtual images onto real-world images or backgrounds to display a single image.

The camera 621 is placed adjacent to at least one of the left or right eyes to capture forward-facing images. As the camera 621 is positioned close to the eye, it can capture the scenes viewed by the user as images. Although FIG. 3 illustrates the first camera unit 621 as provided in the control module 680, this is not necessarily limited to that. The camera 621 may also be installed on the frame section, and a plurality of cameras may be provided to capture stereoscopic images. The camera 621 can be understood as corresponding to the camera 160 described in FIG. 2.

The AR glasses 600 may include user input units 623*a* and 623*b* for receiving control commands. The user input units 623*a* and 623*b* may adopt any tactile manner of operation, such as touch or push, where the user can feel the tactile sensation. FIG. 3 illustrates the frame section and control module 680 as being equipped with user input units 623*a* and 623*b* for push and touch input methods, respectively. The user input units 623*a* and 623*b* can be understood as corresponding to the input device 140 described in FIG. 2.

Additionally, the AR glasses 600 may be equipped with a microphone (not shown) for receiving sound and processing it into electrical voice data, as well as an audio output module 652 for outputting sound. The audio output module 652 may be configured to deliver sound through a general audio output method or a bone conduction method. If the audio output module 652 is implemented using bone conduction, it will vibrate the skull when the user wears the AR glasses 600, thereby transmitting sound.

Figure 4:
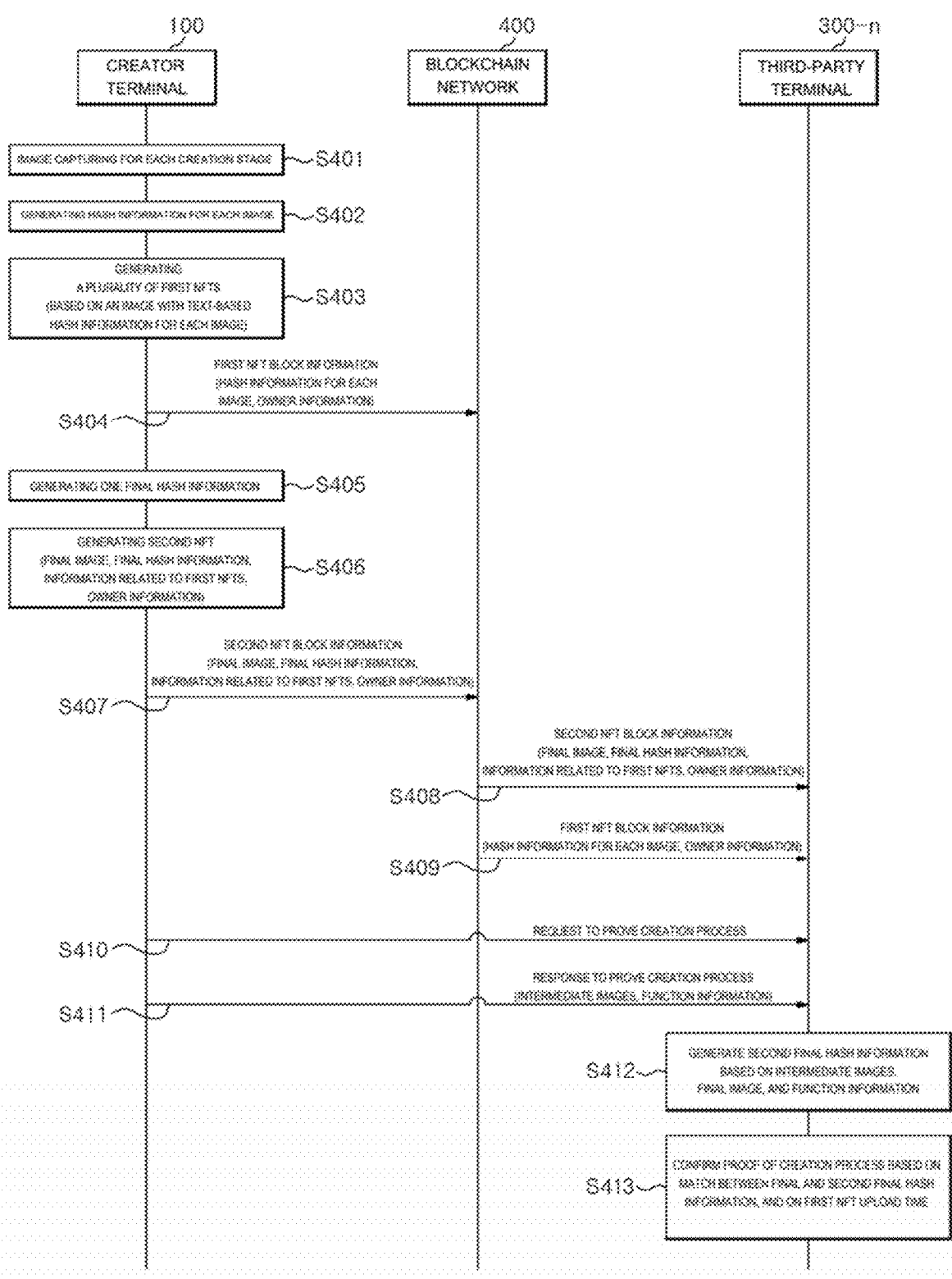
FIG. 4 is a signal sequence diagram of a system according to various embodiments of the present invention.

FIG. 4 is a signal sequence diagram of a system according to various embodiments of the present invention.

In step S401, the creator terminal 100 captures a plurality of intermediate images for each creation stage of a design and one final image using the camera of the creator terminal 100. The plurality of intermediate images are captured during the creation times of the design's creation stages, and the final image is captured at the final creation time of the design.

In step S402, within a set time from the capture time of each of the plurality of intermediate images and the final image, the creator terminal 100 generates a plurality of pieces of intermediate image hash information corresponding to each of the plurality of intermediate images and final image hash information corresponding to the final image. This is done by the processor of the creator terminal 100 using a first function stored in its memory.

In step S403, within the set time from the capture time of each of the plurality of intermediate images and the final image, the creator terminal 100 generates, via its processor, each of a plurality of pieces of first block information for each of a plurality of first non-fungible tokens (NFTs). This is based on an image in a form where each of the plurality of pieces of intermediate image hash information and the final image hash information is described as text, and on information related to the creator terminal 100. The information related to the creator terminal 100 corresponds to the owner information for each of the plurality of first NFTs. The image information included in each of the plurality of first NFTs may correspond to a form in which each of the plurality of pieces of intermediate image hash information and the final image hash information is described as text on a background image.

In step S404, within the set time from the capture time of each of the plurality of intermediate images and the final image, the creator terminal 100 transmits, via its transceiver, each of the plurality of pieces of first block information corresponding to each of the plurality of pieces of intermediate image hash information and the final image hash information to the blockchain network 400.

In step S405, the creator terminal 100 generates final hash information based on the plurality of pieces of intermediate image hash information and the final image hash information. This is done by the processor of the creator terminal 100 using a second function stored in its memory.

In step S406, the creator terminal 100 generates, via its processor, second block information for a second NFT based on the information related to the creator terminal 100, information on the final image, information related to the plurality of first NFTs, and the final hash information. The information related to the creator terminal 100 corresponds to the owner information of the second NFT. The information related to the plurality of first NFTs may correspond to identification information of the plurality of first NFTs, for example, a token ID, NFT address, etc.

In step S407, the creator terminal 100 transmits, via its transceiver, the second block information to the blockchain network 400. Unlike other intellectual property rights such as patents and trademarks, copyright does not require formal procedures like registration or publication and is generated at the moment of creation. Therefore, even if a creator discloses only the final image to the public through the blockchain, it does not mean that copyright for the undisclosed intermediate images does not arise. The creator can disclose only the final image they wish to make public, but by creating an NFT that includes the final hash information generated based on the intermediate images from the designated creation process of the final image, they can provide a basis for proving the creation of the intermediate images in any future disputes.

In step S408, a third-party terminal 300 (300-1, 300-2, . . . , 300-n), which is one of the plurality of nodes constituting the blockchain network 400, receives the second block information from the blockchain network 400 via its transceiver.

In step S409, upon receiving the second block information, the third-party terminal 300 (300-1, 300-2, . . . , 300-n) can obtain the information related to the creator terminal 100 (i.e., the owner information of the second NFT), the information on the final image, the information related to the plurality of first NFTs, and the final hash information from the second block information. The third-party terminal 300 (300-1, 300-2, . . . , 300-n) can then perform step S410 based on the obtained information related to the plurality of first NFTs. The information related to the plurality of first NFTs included in the second NFT indicates that the final image of the second NFT is associated with the intermediate images related to the plurality of first NFTs.

In step S410, the third-party terminal 300 (300-1, 300-2, . . . , 300-n) receives the first block information from the blockchain network 400 via its transceiver. From the first block information, the third-party terminal 300 (300-1, 300-2, . . . , 300-n) can obtain each of the plurality of pieces of intermediate image hash information and the final image hash information, and the information related to the creator terminal 100 (i.e., the owner information of each of the plurality of first NFTs).

In step S411, the third-party terminal 300 (300-1, 300-2, . . . , 300-n) transmits, via its transceiver, a proof request message to the creator terminal 100 for the plurality of intermediate images generated during the creation process of the final image corresponding to the second NFT, based on the owner information of the second NFT in the second block information.

In step S412, the creator terminal 100 transmits, via its transceiver, a proof response message including information on the plurality of intermediate images, information on the first function, and information on the second function to the third-party terminal 300 (300-1, 300-2, . . . , 300-n). The third-party terminal 300 (300-1, 300-2, . . . , 300-n) corresponds to a specified party, not the unspecified public of the blockchain. The creator terminal 100 can transmit the intermediate images to the specified party according to its own will.

According to various embodiments of the present invention, the second function may be configured to generate the final hash information differently according to the order of computation of the plurality of pieces of intermediate image hash information and the final image hash information inputted to it. The order of computation may be based on the creation order of the plurality of intermediate images and the final image. Alternatively, the order of computation may be based on a sequence randomly generated by the creator terminal 100. The proof response message may further include information on the order of computation. Through the information on the order of computation, the creation order of the plurality of intermediate images and the final image can be communicated to the third-party terminal 300 (300-1, 300-2, . . . , 300-n).

In step S413, the third-party terminal 300 (300-1, 300-2, . . . , 300-n) generates a second final hash information based on the information of the final image corresponding to the first NFT in the first block information, the received information on the plurality of intermediate images, the information on the first function, and the information on the second function.

In step S414, the third-party terminal 300 (300-1, 300-2, . . . , 300-n) confirms the proof that the plurality of intermediate images were created during the creation process of the final image, based on whether the final hash information corresponding to the first NFT in the first block information matches the second final hash information generated in step S413.

Figure 5:
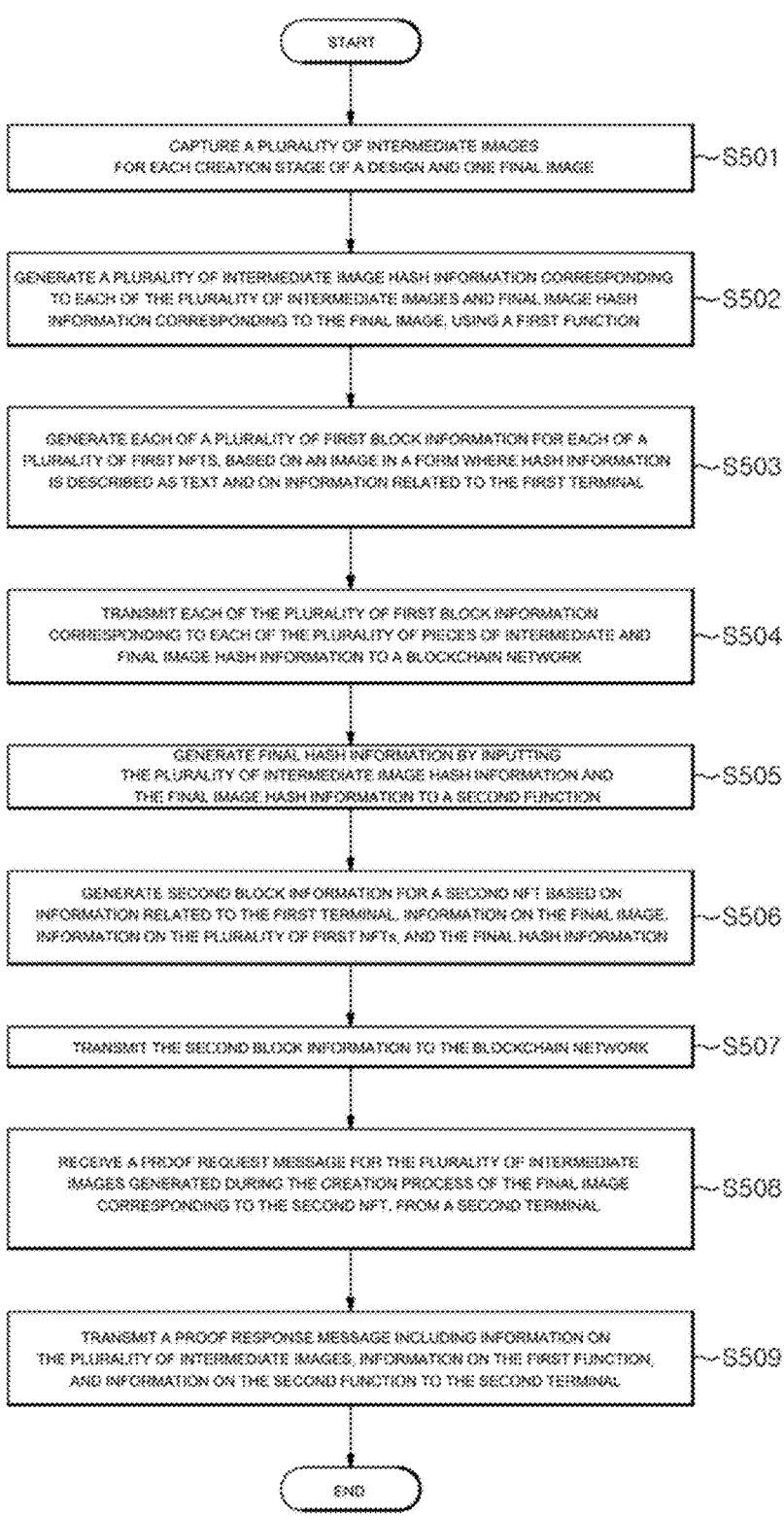
FIG. 5 is a flowchart illustrating an operating process of a creator terminal according to various embodiments of the present invention.

FIG. 5 is a flowchart illustrating an operating process of a creator terminal according to various embodiments of the present invention.

In the embodiment of FIG. 5, the first terminal refers to a creator terminal, and the first terminal includes a transceiver, a memory, a processor, an input device, an output device, and a camera.

Referring to FIG. 5, in step S501, the first terminal captures a plurality of intermediate images for each creation stage of a design and one final image using the camera. The plurality of intermediate images are captured during the creation times of the design's creation stages. The final image is captured at the final creation time of the design.

In step S502, within a set time from the capture time of each of the plurality of intermediate images and the final image, the first terminal generates, via the processor, a plurality of pieces of intermediate image hash information corresponding to each of the plurality of intermediate images and final image hash information corresponding to the final image, using a first function, which is an image hash function, stored in the memory. For example, the first function may be a Secure Hash Algorithm (SHA), such as SHA-256, SHA-512, etc. Alternatively, the first function may, for example, correspond to one of the image hash functions of FIG. 6, FIG. 7, FIG. 8, or FIG. 9, to be described later. It is apparent that the hash function described in this specification is exemplary and not limiting. Alternatively, the first function may correspond to one of various other hash functions.

According to various embodiments of the present invention, the plurality of pieces of intermediate image hash information and the final image hash information may be generated by converting images obtained by passing the plurality of intermediate images and the final image through a specific image filter into specific images of a specific fixed size, and then applying the first function to a specific region of the specific images of the specific fixed size. The specific image filter may be at least one image filter randomly selected by the processor from a plurality of image filters stored in the memory. The specific image filter may include a sequential application combination of a plurality of image filters. The plurality of image filters may be configured such that image transformation is performed differently when an application order for an image is different.

In step S503, within the set time from the capture time of each of the plurality of intermediate images and the final image, the first terminal generates, via the processor, each of a plurality of pieces of first block information for each of a plurality of first non-fungible tokens (NFTs). This is based on an image in a form where each of the plurality of pieces of intermediate image hash information and the final image hash information is described as text, and on information related to the first terminal.

In step S504, within the set time from the capture time of each of the plurality of intermediate images and the final image, the first terminal transmits, via the transceiver, each of the plurality of pieces of first block information corresponding to each of the plurality of pieces of intermediate image hash information and the final image hash information to a blockchain network.

In step S505, the first terminal generates, via the processor, final hash information based on the plurality of pieces of intermediate image hash information and the final image hash information, using a second function stored in the memory. For example, the second function may be a Secure Hash Algorithm (SHA), such as SHA-256, SHA-512, etc. It is apparent that the hash function described in this specification is exemplary and not limiting. Alternatively, the second function may correspond to one of various other hash functions. Alternatively, the second function may, for example, correspond to a combination of logical operations. Examples of logical operations include AND, NOT, NAND, NOR, and so on. The second function may be configured such that for the same input values, the resulting value differs according to the input order.

In step S506, the first terminal generates, via the processor, second block information for a second NFT based on information related to the first terminal, information on the final image, information related to the plurality of first NFTs, and the final hash information. The information related to the first terminal corresponds to the owner information of the first NFT.

In step S507, the first terminal transmits the second block information to the blockchain network via the transceiver.

In step S508, the first terminal receives, via the transceiver, a proof request message from a second terminal, which is one of the plurality of nodes constituting the blockchain network. The request is for the plurality of intermediate images generated during the creation process of the final image corresponding to the second NFT.

In step S509, the first terminal transmits a proof response message including information on the plurality of intermediate images, information on the first function, information on the second function, information on the specific image filter, information on each of the plurality of image filters, information on the application order of the plurality of image filters, and information on the specific fixed size and the specific region to the second terminal via the transceiver.

According to various embodiments of the present invention, the first function may be comprised of one image hash function randomly selected by the processor from a plurality of image hash functions stored in the memory, and the second function may be comprised of one combination randomly selected by the processor from a plurality of combinations of operational functions stored in the memory.

According to various embodiments of the present invention, the second function may be configured to generate the final hash information differently according to the order of computation of the plurality of pieces of intermediate image hash information and the final image hash information inputted to it. The order of computation may be randomly generated by the processor. The proof response message may further include information on the order of computation.

According to various embodiments of the present invention, the second function may be comprised of a combination of a plurality of logical operations randomly selected by the processor from a plurality of logical operations stored in the memory. A combination order of the plurality of logical operations may be randomly generated by the processor.

According to various embodiments of the present invention, the final hash information may be generated by multiplying each of the plurality of pieces of intermediate image hash information and the final image hash information by a respective weight and then inputting the results to the second function. The proof response message may further include information on the respective weights. The respective weights may be configured to increase according to a generation order of the information. A specific value for each of the respective weights may be randomly generated by the processor.

According to various embodiments of the present invention, the hash information may be generated by converting the images into images of a specific fixed size and then applying the first function to a specific region of those images. The proof response message may further include information on the specific fixed size and the specific region.

According to various embodiments of the present invention, the first terminal may be one of a smartphone, a tablet computer, smart glasses, augmented reality (AR) glasses, a smart watch, and a wearable smart device.

According to various embodiments of the present invention, the process in step S502 of generating the hash information may include: extracting a plurality of pieces of binary metadata from each of the images by the processor, and inputting the plurality of pieces of binary metadata to the first function's hash function to generate the hash information.

According to various embodiments of the present invention, each piece of the binary metadata corresponds to the binary form of metadata for each image, and the metadata may include camera information and capture time information for each image.

According to various embodiments of the present invention, the second function can be a hash function into which multiple input values can be entered in a sequence, and it can be configured so that the result differs according to the order of the input values. For example, if the intermediate image hashes are $h_1, h_2, \ldots, h_{n-1}$, and the final image hash is $h_n$, it can be derived as $H(h_1, h_2, \ldots, h_{n-1}, h_n) = h_{n+1}$. Here, H corresponds to the second function (a hash function), and $h_{n+1}$ can correspond to the final hash information. The input order of $h_1, h_2, \ldots, h_{n-1}$, and $h_n$ into the second function H can be determined by the creation order of the images. The user of the first terminal (the creator) can set the input order and notify the second terminal, thereby proving the creation order of the images.

According to various embodiments of the present invention, the embodiment of FIG. 5 may further include: immediately after each of the plurality of intermediate images is captured, generating, by the processor, a plurality of pieces of second block information for a plurality of second NFTs that are encrypted with a first cryptographic key; and immediately after each of the plurality of pieces of second block information is generated, transmitting each piece to the blockchain network via the transceiver. In this case, the proof response message may further include information related to the plurality of second NFTs, information on a second cryptographic key to decrypt the plurality of second NFTs, and information on the creation time of each intermediate image based on the time each block was transmitted to the blockchain.

According to various embodiments of the present invention, the embodiment of FIG. 5 may further include: immediately after each intermediate image is captured, generating, by the processor, the intermediate image hash information using the first function, and a plurality of pieces of second block information based on that hash information; and immediately after each piece of the second block information is generated, transmitting it to the blockchain network. In this case, the proof response message may further include information related to the plurality of pieces of second block information and information on the creation time of each intermediate image based on the transmission time.

According to various embodiments of the present invention, the memory may be configured to store a plurality of image hash functions and a plurality of operational functions. The hash information can be generated using one image hash function (the first function) randomly selected by the processor. The final hash information can be generated using one combination (the second function) randomly selected by the processor from a plurality of combinations of logical operations.

According to various embodiments of the present invention, the memory may be configured to store a plurality of first functions and a plurality of second functions. The hash information may be generated using one first function selected according to a user's first input signal entered via the input device. The final hash information may be generated using one second function selected according to a user's second input signal.

According to various embodiments of the present invention, a first terminal in a communication system is provided, comprising a transceiver, a memory, a processor, an input device, an output device, and a camera, wherein the processor is configured to perform the operating method of the first terminal according to the embodiment of FIG. 5.

According to various embodiments of the present invention, a computer program recorded on a computer-readable storage medium is provided, configured to perform the operating method of the first terminal according to the embodiment of FIG. 5.

FIG. 6 shows examples of image hash functions that are applicable to an image according to various embodiments of the present invention.

FIG. 6 illustrates an average hash algorithm and a block hash algorithm as examples of image hash functions that are applicable to images.

According to the average hash algorithm, a colored source image is converted into grayscale and then scaled down. For example, the image is scaled down to 8×8 pixels to generate 64-bit hash. Subsequently, the average of all gray values of the image is calculated, and then pixels are checked one by one from left to right. When a gray value is larger than the average, 1 is added to the hash, and otherwise, 0 is added to the hash. When the average hash algorithm is applied to the example source image of FIG. 6, hash code (i.e., hash information) of the 00000000000100000000000000010000001000010100000110 1111111111111110 is generated.

According to the block hash algorithm, a colored source image is divided into blocks, and a value of 1 or 0 is generated for each block. These values are sequentially combined into hash from left to right. Since 64-bit hash is necessary, the image is divided into 64 blocks. When the block hash algorithm is applied to the example source image of FIG. 6, the hash code (i.e., hash information) of 0011100010011100000011100110001101000011100001110000111 0100001011100110 is generated.

FIG. 7 shows examples of image hash functions that are applicable to an image according to various embodiments of the present invention.

FIG. 7 illustrates a difference hash algorithm and a median hash algorithm as examples of image hash functions that are applicable to images.

According to the difference hash algorithm, like the average hash algorithm, a grayscale image is generated from a colored source image and scaled down to 9×8 pixels. In each row, the first eight pixels are sequentially checked from left to right, and 64-bit hash is generated like the average hash algorithm. When the difference hash algorithm is applied to the example source image of FIG. 7, the hash code (i.e., hash information) of 1111000000110000101110001100111010000110010011001000111010001110 is generated.

The median hash algorithm works similarly to the average hash algorithm except that each pixel is compared with the median instead of the average. When the median hash algorithm is applied to the example colored source image of FIG. 7, the hash code (i.e., hash information) of 0000000010011100000011000110001101000010100001111111111111111111 is generated.

FIG. 8 shows an example of an image hash function that is applicable to an image according to various embodiments of the present invention.

FIG. 8 illustrates a perceptual hash algorithm as an example of an image hash function that is applicable to images.

The Perceptual Hash algorithm generates a grayscale image from an initially colored source image, and then computes and shrinks the grayscale image. In the example of FIG. 7, a factor of 4 is wanted, and thus the grayscale image is scaled down to an (8×4)×(8×4), that is, 32×32, image. A discrete cosine transform is applied to the image in rows and then columns.

The discrete cosine transform is as follows:

$$X_k = \sum_{n=0}^{N-1} 2n * \cos\left(\pi * k * \frac{2n+1}{2N}\right) \forall\, k \in [0, N]$$

Since pixels with a high frequency are now located at the upper left corner, 8×8 pixels of the upper left corner are cropped from the image. Subsequently, the median of grayscale values of the image is calculated, and a hash value is generated from the image like the median hash algorithm.

When the perceptual hash algorithm is applied to the example colored source image of FIG. 8, the hash code (i.e., hash information) of 1010010010101101100110011011001101100010100100000111011010101110 is generated.

FIG. 9 shows an example of an image hash function that is applicable to an image according to various embodiments of the present invention.

FIG. 9 illustrates a wavelet hash algorithm as an example of an image hash function that is applicable to images.

According to the wavelet hash algorithm, like the average hash algorithm, an 9×8 size grayscale image is generated. Subsequently, a two-dimensional (2D) wavelet transform is applied to the image. According to test results, when the uppermost row was set to 0, that is, black, and a wavelet transform was applied three times, the result was improved. Subsequently, like the perceptual hash algorithm, each pixel is compared with the median, and a hash is calculated.

When the wavelet hash algorithm is applied to the example source image of FIG. 9, the hash code (i.e., hash information) of 0000010110111001111110011111101111111010000000000000011100000101 is generated.

Figure 10:
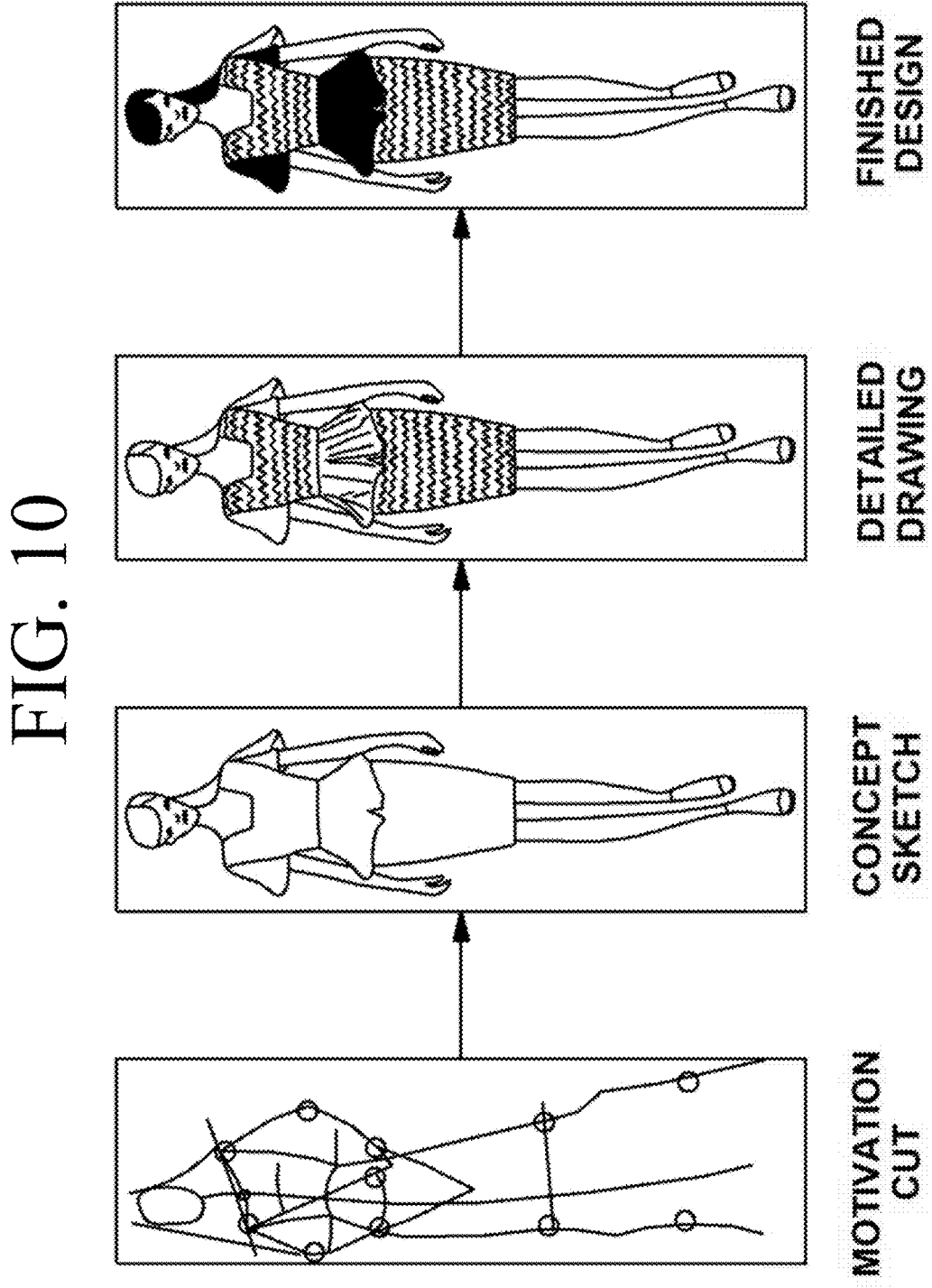
FIG. 10 shows examples of creation stage-specific creative designs according to various embodiments of the present invention.

FIG. 10 shows examples of creation stage-specific creative designs according to various embodiments of the present invention.

Referring to FIG. 10, images of four stages are shown as illustrative creation stage-specific creative designs. A motivation cut corresponds to an image that reflects initial inspiration or motivation of a creative design. A concept sketch corresponds to an image that represents the concept of the creative design. A detailed drawing corresponds to an image that shows specific details of the creative design. A finished design corresponds to a final image that is finished enough to be applied to a product. According to various embodiments of the present invention, creation stage-specific creative designs may include a captured image of a hand-drawn drawing and various forms of design images, such as a screenshot, a saved image file, or the like in the case of using a computer design program. According to various embodiments of the present invention, creation stage-specific creative designs may include various design features such as the composition of a design, the placement of each design element, a weave design for fabric, the shapes and locations of buttons, and the like.

A creator can prove the direct causal relationship of the creative design by sharing information on the creation stage-specific creative designs of FIG. 10 through a blockchain network.

By issuing NFTs for creative design images corresponding to a set number of stages as illustrated in FIG. 10 to disclose the creation process of the creative design, the creator can prove that the creator who is the owner of the NFTs created the creation stage-specific creative designs which are the content of the NFTs.

Also, a creator may combine hash codes for intermediate images in the creation process of a creative design, such as a painting, an art work, a commercial or non-commercial design, or the like, and a hash code for a final image using an operation function to generate one piece of final hash information and then transmit an NFT including the final hash information and information on the final image to a blockchain. In this way, the design creator can claim the relationship between the intermediate images in the creation process of the creative design and the final image at the time of disclosing the design on the blockchain network. After that, when there is a problem with the creation process of the final image, the creator can prove the originality of the creative design from the creation process.

Figure 11:
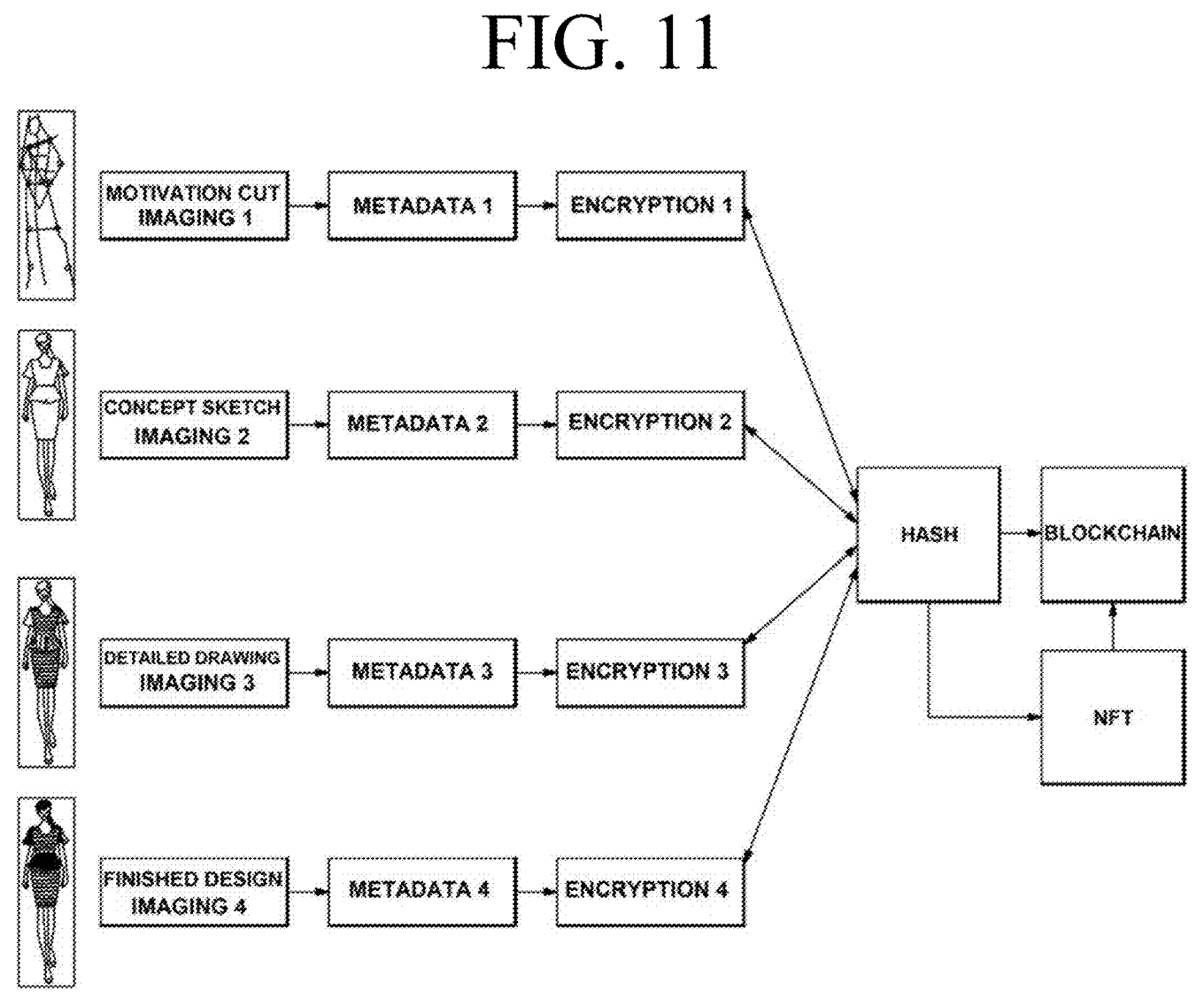

FIG. 11 is a diagram illustrating an NFT generation process based on creation stage-specific creative designs according to various embodiments of the present invention.

Referring to FIG. 11, a process of generating metadata from creation stage-specific creative images, encrypting the generated metadata, and generating hash information on the basis of the encrypted image information is shown.

The generated hash information may be immediately transmitted to a blockchain network as block information and shared among nodes sharing the blockchain. Also, an NFT may be generated on the basis of the hash information, and then the hash information may be transmitted to the blockchain network in the form of the NFT.

Both hash information and an NFT only include image information which was encrypted using an encryption key. After that, when the creator transmits information on the encryption key to the blockchain network at a point in time that the creator wants to make the design public, nodes connected to the blockchain may decrypt the encrypted images using the encryption key and then view the images.

Since there are timestamps for dates of capturing the images in the image information and information on the time at which the hash information or NFT is shared in the blockchain network, it is possible to prove information on the creation time of each creation stage-specific creative image to prove the originality of the creation stage-specific creative image.

Figure 12:
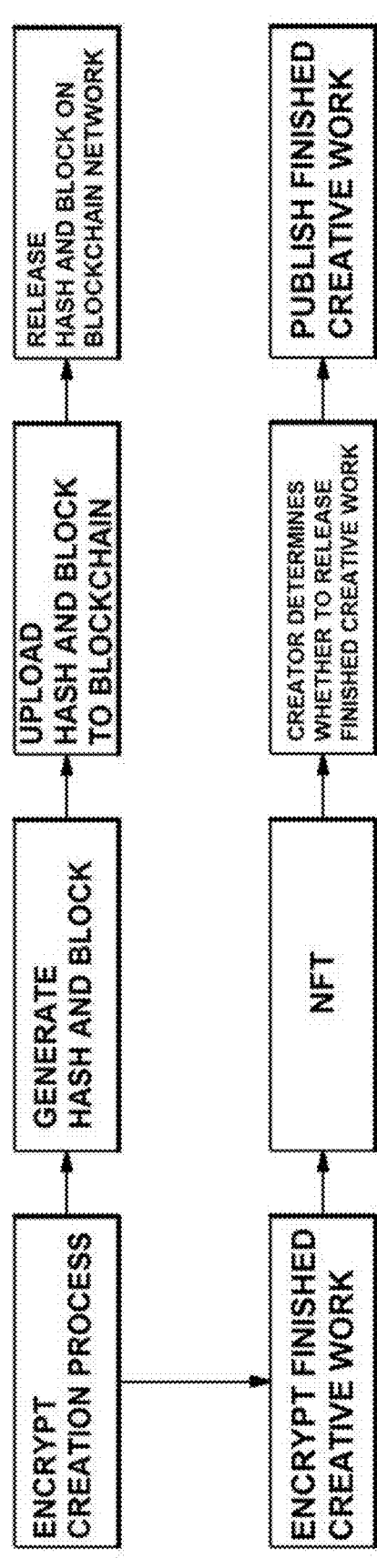
FIG. 12 is a diagram illustrating an NFT generation and publishing process based on creation stage-specific creative designs according to various embodiments of the present invention.

FIG. 12 is a diagram illustrating an NFT generation and publishing process based on creation stage-specific creative designs according to various embodiments of the present invention.

Referring to FIG. 12, after a design is created, creation stage-specific images may be captured and then immediately encrypted. Also, a hash and block information may be generated, and the generated hash and block information may be uploaded to a blockchain network and released on the blockchain network.

Also, after the creation is finished, a plurality of selected creation stage-specific images may be encrypted, and then an NFT may be generated. The NFT may be shared among nodes through the blockchain. Since the creator is set as the owner of the NFT, it is possible to prove that the creator is the original creator of the creative design through the proof of ownership of the NFT. The creator may upload the NFT including the encrypted images to the blockchain and then upload information on a key for decrypting the encryption to the blockchain at the time point of release wanted by the creator. In this way, by initially uploading the NFT, it is possible to set a time point wanted by the creator as the time point of release while proving the time point of creation. After that, while publishing a second NFT on the basis of the creative image, it is possible to set the second NFT to include the NFT including the initially encrypted creative design and the information on the decryption key as associated information.

Further, for each of a product with a creative design, a licensee who has a license agreement with a creator for the creative design, and a product produced by the licensee, a third NFT may be newly generated and issued to prove whether the creative design has been applied, whether the licensee is legally licensed to use the design, and whether the licensee has produced the product. The issued third NFT may be configured to include the NFT including the initially encrypted creative design and the information on the decryption key.

Figure 13:
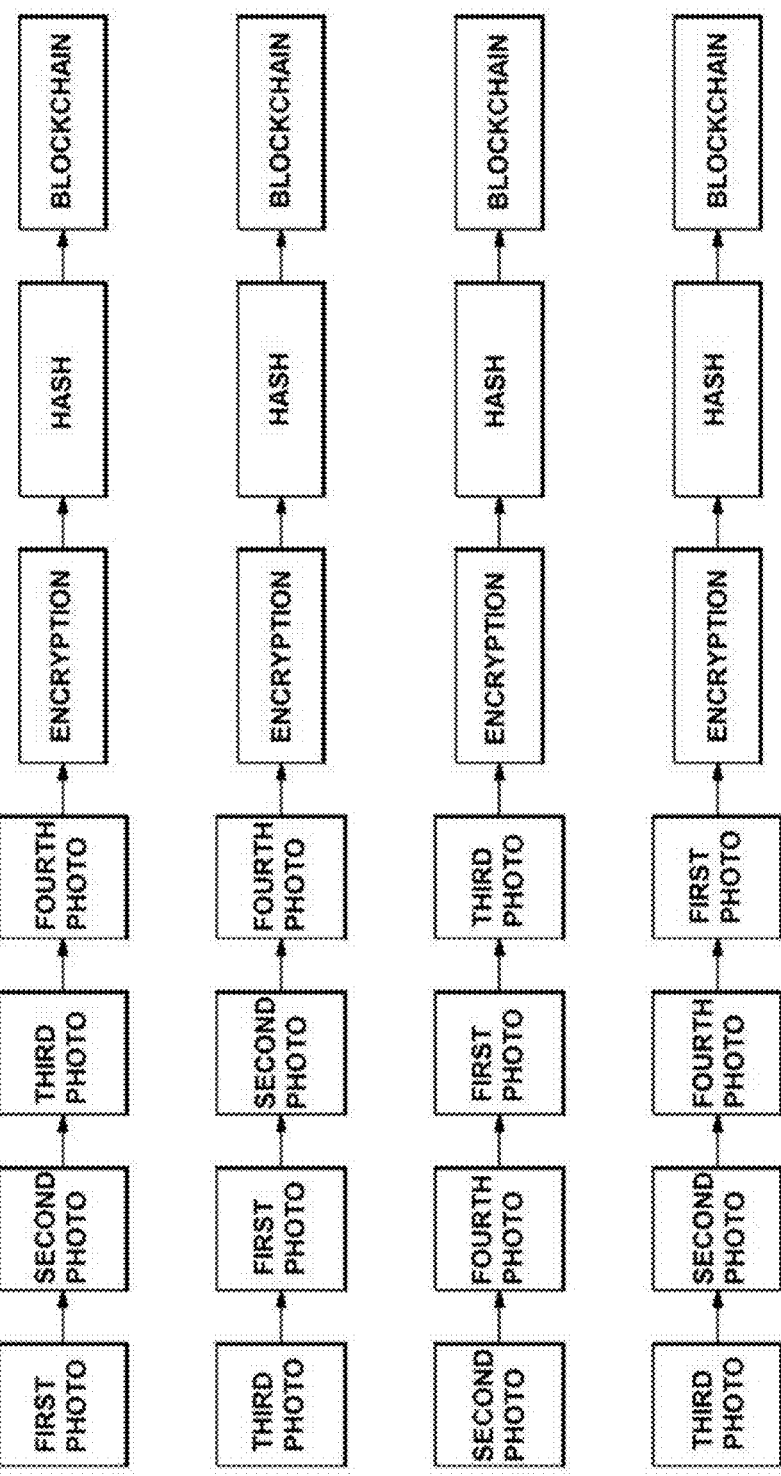
FIG. 13 is a diagram illustrating a process of generating and uploading encrypted information based on creation stage-specific creative designs to a blockchain according to various embodiments of the present invention.

FIG. 13 is a diagram illustrating a process of generating and uploading encrypted information based on creation stage-specific creative designs to a blockchain according to various embodiments of the present invention.

Referring to FIG. 13, the order in which creation process images of creation-process designs are encrypted may be determined by the creator or may be randomly determined by a computer. Accordingly, selected creation stage-specific images 1, 2, 3, and 4 may be sequentially encrypted or may be encrypted in a random sequence such as 2, 3, 1, and 4. With such irregularity in encryption order, it is possible to achieve a higher security level.

FIG. 14 is a diagram illustrating a process of generating and uploading an encrypted NFT based on creation stage-specific creative designs to a blockchain according to various embodiments of the present invention.

Referring to FIG. 14, a creator may capture images of creation stage-specific designs during a creation process and prove the creation time of each intermediate design in the creation process using timestamp information about the time points at which the images were captured.

The creator may select a plurality of images that may represent the development of the creation process from among multiple images captured during the creation process. Although the images of four intermediate designs are illustrated in the drawing of the present invention, the number of images is a mere example and is not limited to four.

Each of the intermediate designs may correspond to one of a motivation cut, a concept sketch, a detailed drawing, and a finished design.

After the image of each intermediate design is captured, metainformation about each image may be generated. The metainformation may include information on a person who captured the image, that is, the creator. Also, the metainformation may include timestamp information about the time at which the image was captured. In addition, the metainformation may include Global Positioning System (GPS) information about the location at which the image was captured.

Information on the plurality of images may be rearranged irrespective of time in an order determined by the creator or a computer-based random function. The plurality of rearranged images may be encrypted, and an NFT may be generated for the encrypted information. Alternatively, encryption may be performed in the creation order, that is, an order in which the photograph images were generated, and an NFT may be generated for the encrypted information.

The generated NFT may be transmitted to a blockchain network to issue the NFT.

Multiple nodes constituting the blockchain network may receive the NFT but are not aware of the creative designs because the nodes access only the encrypted images without a key for decryption.

Subsequently, the creator transmits information on the key for decryption to the blockchain network at the time point of release set by the creator so that the multiple nodes can decrypt the encrypted images in the NFT and view the images.

The creator can prove the originality by proving the creation times of the creation stage-specific designs and proving that he or she is the creator of the creation stage-specific designs using the metainformation of the images in the NFT.

A creator may capture a plurality of images of intermediate images during the creation process of a design using his or her terminal device, such as a smartphone or the like, functionalize the metainformation of each image file, and generate one hash code on the basis of the functions. The creator may upload the hash code to a blockchain network and generate an NFT from a finished final image to prove the causal relationship between the creator and creative designs.

While hash values of the creative designs are transmitted to the blockchain network, a closed NFT may be generated from the final image of the creative designs, and whether to release the closed NFT may be determined by the creator. Therefore, before the images of the creative designs are released, the hash values for proving the creation process of the creative designs may be transmitted to the blockchain, and then the time point at which the hash values were transmitted may be proved so that the originality of the intermediate images in the creation process can be proved. Since the creation process is recorded in the creator's terminal and log information about the transmission of the final hash value remains in the creator's terminal, it is possible to prove the originality of the creative designs without releasing the image of the final creative design. In other words, the hash values are transmitted and released to the blockchain network, but the finished image of which the causal relationship has been proved may be stored in the creator's terminal.

Figure 15:
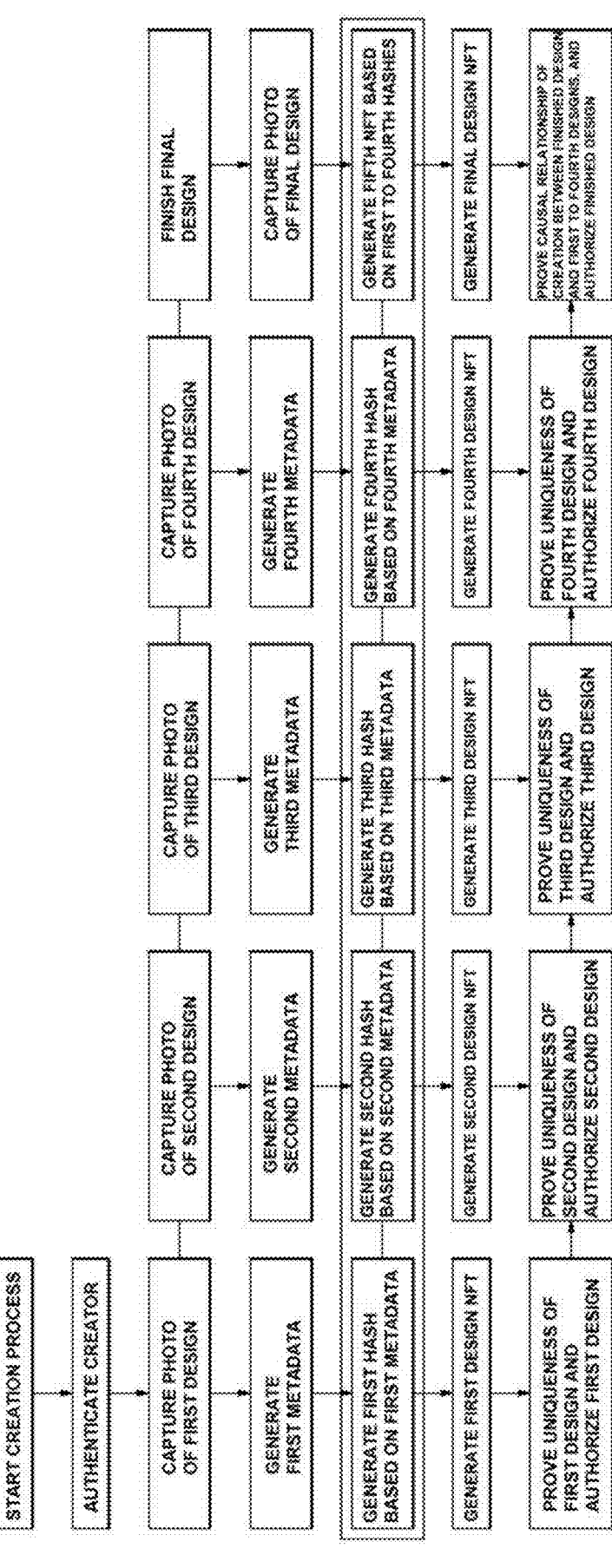
FIG. 15 is a diagram illustrating a process of generating and uploading NFTs based on creation stage-specific creative designs to a blockchain according to various embodiments of the present invention.

FIG. 15 is a diagram illustrating a process of generating and uploading NFTs based on creation stage-specific creative designs to a blockchain according to various embodiments of the present invention.

FIG. 15 shows an illustrative process for proving the causality between creation process images and a final image according to various embodiments of the present disclosure. The entire process of the embodiment of FIG. 14 may be performed by a creator using a creator terminal. The creator terminal is a computing device capable of wired and wireless communication such as a personal computer (PC), a smartphone, a tablet computer, smart glasses, and augmented reality (AR) glasses, or the like.

Referring to FIG. 15, every time each of intermediate designs including a first design, a second design, a third design, and a fourth design is created after a creation work, the creator authenticates himself or herself through an application and then captures photographs or digital images of the intermediate designs. Since the photograph or digital image of each intermediate design is captured immediately after the intermediate design is created, the photograph or digital image is assumed to be captured at the time point at which the intermediate design is created.

First metadata, second metadata, third metadata, and fourth metadata are generated for the intermediate designs by photographing intermediate designs or capturing the images of the intermediate designs.

A first hash, a second hash, a third hash, and a fourth hash are generated on the basis of the first metadata, the second metadata, the third metadata, and the fourth metadata, respectively.

According to the creator's selection, a first design NFT, a second design NFT, a third design NFT, and a fourth design NFT are generated by photographing each of the intermediate designs or capturing the image of each intermediate design. According to the creator's selection, the first design NFT, the second design NFT, the third design NFT, and the fourth design NFT may be uploaded to a blockchain network. According to the creator's selection, the first design NFT, the second design NFT, the third design NFT, and the fourth design NFT may be generated on the basis of encrypted image information of the photograph or captured image of each of the intermediate designs. According to the creator's selection, each of the intermediate designs may or may not be made public.

After the creation process of a final design based on the intermediate designs is finished, the creator photographs the finished final design or captures a digital image thereof. A fifth hash is generated on the basis of the first hash, the second hash, the third hash, and the fourth hash of the intermediate designs.

The creator generates a final design NFT on the basis of the photograph or captured digital image of the final design and the fifth hash. The final design NFT includes information on the creator or information on the creator terminal as NFT owner information. The final design NFT is uploaded to the blockchain network.

When the final design NFT is uploaded to the blockchain network, the image of the final design and the fifth hash are shared among a plurality of nodes constituting the blockchain network.

After that, when the creator or creator terminal receives a request for the creation process of the final design from someone, the creator can prove that the final design was created from the first design, the second design, the third design, and the fourth design by proving that the fifth hash was generated from the first hash, the second hash, the third hash, and the fourth hash and proving that the first hash, the second hash, the third hash, and the fourth hash were generated from the first design, the second design, the third design, and the fourth design.

Figure 16:
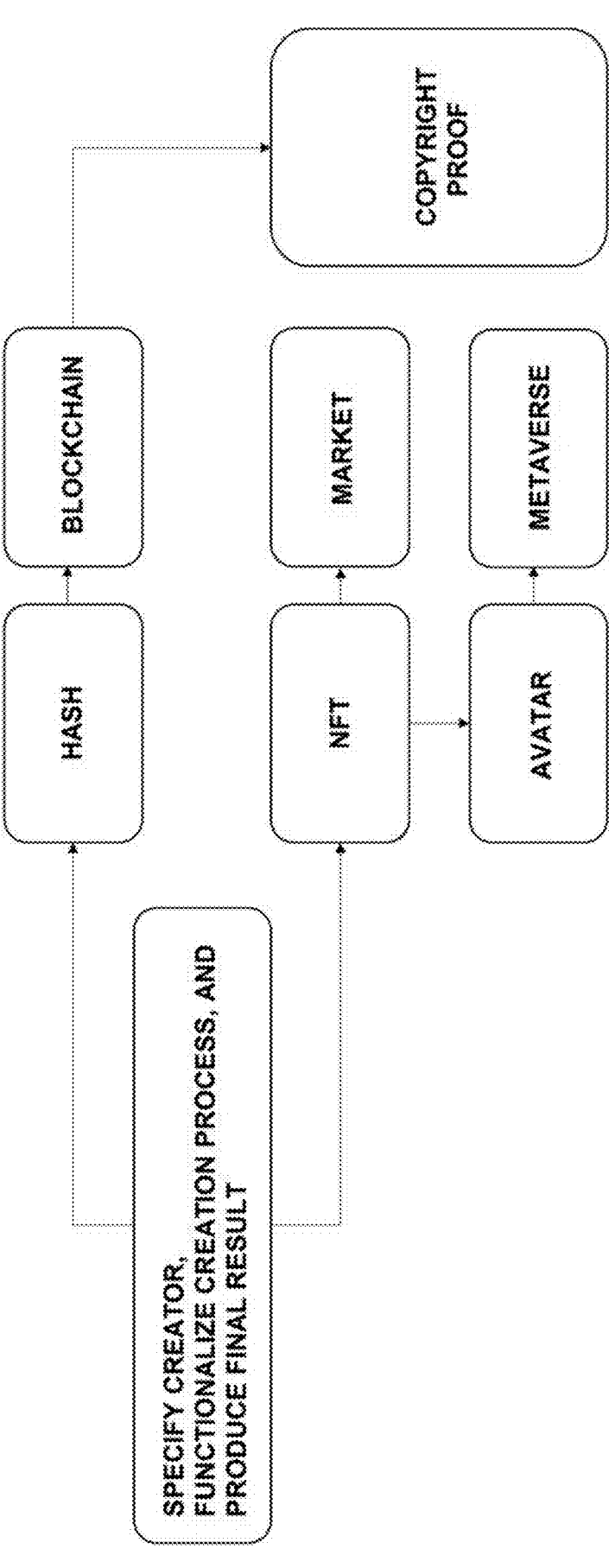
FIG. 16 is a diagram illustrating a process of proving the originality of a creative design using a hash and NFT generated on the basis of creation stage-specific creative designs according to various embodiments of the present invention.

FIG. 16 is a diagram illustrating a process of proving the originality of a creative design using a hash and NFT generated on the basis of creation stage-specific creative designs according to various embodiments of the present invention.

Referring to FIG. 16, a creator generates "sequentially invertible functions" by inserting an encryption code generated by the creator to multiple image files generated in a creation process, converts the sequentially invertible functions into one final hash function, and uploads the final hash function to a blockchain. Through this process, it is possible to register and protect the design copyright of a creative work and simultaneously issue a final result of the creation process as an NFT. In other words, the invertible functions are generated from the creation process, an invertible function is generated from the final creative result, a block for the final hash code is generated on the basis of the invertible function, and the NFT is generated on the basis of the block.

The invertible functions are generated by inserting the encryption code generated by the creator to each piece of metadata (a device identifier (ID), location information, imaging time information (timestamp), quality information, such as an image resolution and the like, and the like) of multiple digital images of creation-process designs, and in the same manner, the invertible function is generated from the digital image of the final image. The final hash is generated from the invertible function and uploaded to the blockchain.

The present invention may be applied to the design of clothing sold on online commerce markets on the basis of NFTs or the designs of clothes applied to avatars on a metaverse platform. For example, the ownership of an original NFT may be vested in the creator of an original design, and an NFT derived from the original NFT may be generated and transferred with apparel or an apparel item to a purchaser of the apparel sold on the basis of the design on an online commerce market or the apparel item applied to an avatar on the metaverse platform. For example, the derivative NFT may include information related to the original NFT, the electronic signature of the original creator, and the like. Accordingly, purchasers of apparel on the online commerce market or apparel items applied to avatars on the metaverse platform can obtain proof that the apparel or apparel items are based on the original design.

Various embodiments of the present invention relate to a method and device for proving the originality of a creative design by proving the creation time of the design in relation to fine art, commercial or non-commercial art, or the like, such as apparel, shoes, an accessory, a hat, a bag, a watch, a painting, a sculpture, or the like of which visual design elements have a decisive influence on determining the market value of the goods.

Existing design-related methods employing a blockchain are based on registration and authorization of finished designs or finished shapes. However, with these methods, it is not possible to objectively (technically) prove the direct causal relationship between a creator and the original design, prevent fraud, or copying or imitating a finished design or a design sketch or shape during the creation process without the creator's consent, or to objectively prove fraud.

With the recent emergence of NFTs which prove the uniqueness of all digitizable content, such as artworks, digital music, commercial and non-commercial designs, and the like, along with new technologies, such as blockchain, metaverse, cryptocurrency, and the like, there have been high expectations that it will be possible to overcome the technical limitations of existing copyright registration and protection. However, there have been side effects such as issuing NFTs of other people's works without the approval and consent of the copyright holder or issuing NFTs of imitations or counterfeits. These problems represent that it is not possible to overcome the logical limitations of the current copyright registration and protection system, which requires copyright registration and rights based on a "finished image or shape," and NFTs issued on the basis of the copyright registration and protection system also have fundamental limitations in proving unequivocal uniqueness on the basis of the direct causal relationship between the creator and the creative work.

The textile fashion industry is a very fast-moving market in which new designs and products are created, produced, and distributed seasonally. The legal procedures and time required for registration and authorization under the current design copyright system are not only inappropriate for the fast fashion-driven textile and fashion industries but also lead to frequent economic and psychological damage to creators and significant social costs due to market-destroying activities such as design theft, plagiarism, and the like that occur inertially. In addition, the current copyright registration and authorization system is recognized as a hindrance to the overall qualitative growth of the industrial ecosystem and thus is proven to be an unreasonable alternative.

According to the recently emerged NFT technology, it is also impossible to prevent copyright infringement and fraud such as third parties issuing NFTs for financial gain without the authorization of the creator. To solve these problems, according to the present invention, it is possible to functionalize the "intermediate result images in the creation process and a final creative result image," convert the functions into a single hash to digitize the causality between the creation process and the creative result, and upload the single hash to a blockchain to clearly prove the causality, thus protecting the copyright of creative works.

Various embodiments of the present invention propose a method of proving the originality of a creative design by proving that a creator is the creator of the design and the time point of creation. The creator may sequentially photograph intermediate designs using a terminal device with a camera during the creation process, generate a plurality of pieces of hash information on the basis of metainformation about image files of the plurality of pieces of intermediate designs and a final design, which may show the development of the design creation process, and issue the plurality of pieces of hash information as an NFT while uploading the hash information to a blockchain.

Various embodiments of the present invention are intended to prove the direct causal relationship between a creator and a creative design and also prove whether the original design was applied to each distributed product by issuing a new NFT associated with the NFT of the original design for each of distributed products, to which the creative design was applied, and transferring ownership of the newly issued NFT to a purchaser of the product.

When embodiments of the present invention are implemented using hardware, application-specific integrated circuits (ASICs), digital signal processors (DSPs), digital signal processing devices (DSPDs), programmable logic devices (PLDs), field programmable gate arrays (FPGAs), or the like configured to perform the present invention may be included in the processor of the present invention.

Meanwhile, the method described above can be implemented as a program executable in a computer and executed in a general-use digital computer that executes the program using a computer-readable medium. The structure of data used in the foregoing method may be recorded in computer-readable storage medium in various ways. It should be understood that program storage devices that may be used for describing a storage device including executable computer code for performing various methods of the present invention do not include temporary objects such as carrier waves or signals. The computer-readable storage medium includes a storage medium such as a magnetic storage medium (e.g., a read-only memory (ROM), a floppy disk, a hard disk, or the like) or an optical medium (e.g., a compact disc (CD)-ROM, a digital versatile disc (DVD), or the like).

The embodiments described above are constructed by combining components and features of the present invention in a certain form. Each component or feature should be considered selective unless explicitly mentioned otherwise. Each component or feature may be implemented without being combined with other components or features. In addition, some components and/or features may be combined into an embodiment of the present invention. The sequence of operations described in embodiments of the present invention may be changed. Some elements or features of an embodiment may be included in another embodiment or replaced by corresponding elements or features of another embodiment. It is obvious that claims not explicitly recited may be combined into an embodiment or included as a new claim by amendment after filing.

Those skilled in the art will appreciate that the present invention may be implemented in other specific forms without departing from the technical spirit or essential features thereof. Therefore, the above embodiments are to be construed as illustrative rather than restrictive in all aspects. The scope of the present invention should be determined by a reasonable interpretation of the appended claims and all possible variations within the scope of the present invention or an equivalent thereof.

INDUSTRIAL APPLICABILITY

The present invention relates to a method and device for proving the originality of a creative design work and who is the original creator in a communication system by proving the causal relationship between the creation process of the creative design work and the resultant creative work using the hash codes of images in creation stages of the creative design work.

The invention claimed is:

1. An operating method of a first terminal including a transceiver, a memory, a processor, an input device, an output device, and a camera in a communication system, the operating method comprising:

capturing, by the camera, a plurality of intermediate images in creation stages of a design and one final image, wherein the plurality of intermediate images are captured during creation times of the creation stages of the design and the final image is captured during a final creation time of the design;

generating, by the processor, within a set time from the time of capturing each of the plurality of intermediate images and the final image: a plurality of pieces of intermediate image hash information corresponding to each of the plurality of intermediate images and final image hash information corresponding to the final image using a first function, which is an image hash function, stored in the memory, wherein the first function is configured as an image hash function configured to convert image data into hash information, and the plurality of pieces of intermediate image hash information and the final image hash information are generated by converting images obtained by passing the plurality of intermediate images and the final image through a specific image filter into specific images of a specific fixed size, and then applying the first function to a specific region of the specific images of the specific fixed size, and the specific image filter is at least one image filter randomly selected by the processor from a plurality of image filters stored in the memory, wherein the specific image filter includes a sequential application combination of a plurality of image filters, and the plurality of image filters are configured such that image transformation is performed differently when an application order for an image is different;

generating, by the processor, within the set time from the time of capturing each of the plurality of intermediate images and the final image: each of a plurality of pieces of first block information for each of a plurality of first non-fungible tokens (NFTs) based on an image in a form in which each of the plurality of pieces of intermediate image hash information and the final image hash information is described as text, and information related to the first terminal;

transmitting, by the transceiver, within the set time from the time of capturing each of the plurality of intermediate images and the final image: each of the plurality of pieces of first block information corresponding to each of the plurality of pieces of intermediate image hash information and the final image hash information to a blockchain network;

inputting the plurality of pieces of intermediate image hash information and the final image hash information to a second function stored in the memory to generate final hash information by the processor, wherein the second function is composed of a combination of logical operations;

generating, by the processor, second block information for a second NFT based on the information related to the first terminal, information on the final image, information related to the plurality of first NFTs, and the final hash information;

transmitting, by the transceiver, the second block information to the blockchain network;

receiving, by the transceiver, a proof request message for the plurality of intermediate images generated in a creation process of the final image corresponding to the second NFT from a second terminal which is one of a plurality of nodes constituting the blockchain network; and transmitting, by the transceiver, a proof response message including information on the plurality of intermediate images, information on the first function, information on the second function, information on the specific image filter, information on each of the plurality of image filters, information on the application order of the plurality of image filters, and information on the specific fixed size and the specific region to the second terminal.

2. The method of claim 1,
wherein the first function is comprised of one image hash function randomly selected by the processor from a plurality of image hash functions stored in the memory, and wherein the second function is comprised of one combination randomly selected by the processor from a plurality of combinations of operational functions stored in the memory.

3. The method of claim 1,
wherein the second function is configured to generate the final hash information differently according to an order of computation of the plurality of pieces of intermediate image hash information and the final image hash information inputted to the second function,
wherein the order of computation is randomly generated by the processor, and
wherein the proof response message further comprises information on the order of computation.

4. The method of claim 3,
wherein the second function is comprised of a combination of a plurality of logical operations randomly selected by the processor from a plurality of logical operations stored in the memory, and
wherein a combination order of the plurality of logical operations is randomly generated by the processor.

5. The method of claim 1,
wherein the final hash information is generated by multiplying each of the plurality of pieces of intermediate image hash information and the final image hash information by a respective weight and then inputting the results to the second function,
wherein the proof response message further comprises information on the respective weights for the plurality of pieces of intermediate image hash information and the final image hash information,
wherein the respective weights are configured to increase according to a generation order of the plurality of pieces of intermediate image hash information and the final image hash information, and
wherein a specific value for each of the respective weights is randomly generated by the processor.

6. The method of claim 1,
wherein the first terminal is one of a smartphone, a tablet computer, smart glasses, augmented reality (AR) glasses, a smart watch, and a wearable smart device.

7. A first terminal in a communication system, the first terminal comprising:
a transceiver;
a memory;
a processor;
an input device;
an output device; and
a camera,
wherein the processor is configured to perform a method comprising: capturing, by the camera, a plurality of intermediate images in creation stages of a design and one final image, wherein the plurality of intermediate images are captured during creation times of the creation stages of the design and the final image is captured during a final creation time of the design;
generating, by the processor, within a set time from the time of capturing each of the plurality of intermediate images and the final image: a plurality of pieces of intermediate image hash information corresponding to each of the plurality of intermediate images and final image hash information corresponding to the final image using a first function, which is an image hash function, stored in the memory, wherein the first function is configured as an image hash function configured to convert image data into hash information, and the plurality of pieces of intermediate image hash information and the final image hash information are generated by converting images obtained by passing the plurality of intermediate images and the final image through a specific image filter into specific images of a specific fixed size, and then applying the first function to a specific region of the specific images of the specific fixed size, and the specific image filter is at least one image filter randomly selected by the processor from a plurality of image filters stored in the memory, wherein the specific image filter includes a sequential application combination of a plurality of image filters, and the plurality of image filters are configured such that image transformation is performed differently when an application order for an image is different;

generating, by the processor, within the set time from the time of capturing each of the plurality of intermediate images and the final image: each of a plurality of pieces of first block information for each of a plurality of first non-fungible tokens (NFTs) based on an image in a form in which each of the plurality of pieces of intermediate image hash information and the final image hash information is described as text, and information related to the first terminal;

transmitting, by the transceiver, within the set time from the time of capturing each of the plurality of intermediate images and the final image: each of the plurality of pieces of first block information corresponding to each of the plurality of pieces of intermediate image hash information and the final image hash information to a blockchain network;

inputting the plurality of pieces of intermediate image hash information and the final image hash information to a second function stored in the memory to generate final hash information by the processor, wherein the second function is composed of a combination of logical operations;

generating, by the processor, second block information for a second NFT based on the information related to the first terminal, information on the final image, information related to the plurality of first NFTs, and the final hash information;

transmitting, by the transceiver, the second block information to the blockchain network;

receiving, by the transceiver, a proof request message for the plurality of intermediate images generated in a creation process of the final image corresponding to the second NFT from a second terminal which is one of a plurality of nodes constituting the blockchain network; and transmitting, by the transceiver, a proof response message including information on the plurality of intermediate images, information on the first function, information on the second function, information on the specific image filter, information on each of the plurality of image filters, information on the application order of the plurality of image filters, and information on the specific fixed size and the specific region to the second terminal.

* * * * *